(12) United States Patent
Kasuga et al.

(10) Patent No.: US 8,761,921 B2
(45) Date of Patent: Jun. 24, 2014

(54) SYSTEM, OPERATION CELL, METHOD, PRODUCT MANUFACTURING METHOD, AND MARKER FOR LOCATING OPERATION POSITION

(75) Inventors: Toshinori Kasuga, Kawasaki (JP); Hirokazu Yamanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1168 days.

(21) Appl. No.: 11/947,255

(22) Filed: Nov. 29, 2007

(65) Prior Publication Data

US 2008/0177417 A1    Jul. 24, 2008

(30) Foreign Application Priority Data

Jan. 24, 2007 (JP) ................................. 2007-014338

(51) Int. Cl.
*G06F 19/00* (2011.01)
*G05B 19/00* (2006.01)
*B23Q 17/00* (2006.01)
*G01N 21/00* (2006.01)

(52) U.S. Cl.
USPC ........... 700/194; 700/108; 700/110; 700/259; 29/407.01; 29/407.04; 356/237.1

(58) Field of Classification Search
USPC ................. 700/104, 108, 116, 194, 110, 259; 29/407.01, 407.04, 407.05; 356/237.1
See application file for complete search history.

(56) References Cited

U.S. PATENT DOCUMENTS

| 4,613,943 | A | * | 9/1986 | Miyake et al. | 700/251 |
|---|---|---|---|---|---|
| 4,633,385 | A | * | 12/1986 | Murata et al. | 700/86 |
| 4,787,136 | A | * | 11/1988 | Majic | 29/709 |
| 6,718,057 | B1 | * | 4/2004 | Mori | 382/141 |
| 6,762,426 | B1 | * | 7/2004 | Gilliam | 250/559.12 |
| 6,928,332 | B2 | * | 8/2005 | Gass | 700/108 |
| 7,359,762 | B2 | * | 4/2008 | Etter et al. | 700/180 |
| 8,161,613 | B2 | | 4/2012 | Schuele et al. | |

(Continued)

FOREIGN PATENT DOCUMENTS

| DE | 3637236 A1 | 5/1988 |
|---|---|---|
| DE | 10205605 A1 | 8/2003 |

(Continued)

OTHER PUBLICATIONS

European Search Report dated May 2, 2008, issued in corresponding European Patent Application No. 07121757.4.

(Continued)

*Primary Examiner* — Darrin Dunn
(74) *Attorney, Agent, or Firm* — Fujitsu Patent Center

(57) ABSTRACT

An operation position locating system locates a position on a product where an operation is performed in a manufacturing process of the product including one or more operations to be performed. The system includes an operation completion coordinates detection unit and an operation position locating unit. The operation completion coordinates detection unit processes a plurality of images obtained by capturing from a plurality of viewpoints a range including an operation completion position where an operation is completed when the operation is completed, thereby detecting a set of operation completion coordinates representing the operation completion position. The operation position locating unit obtains a set of operation coordinates representing an operation position where the operation is to be performed on each operation, and locates the operation position corresponding to the operation completion position based on the set of operation completion coordinates and the one or more obtained sets of operation coordinates.

12 Claims, 14 Drawing Sheets

(56) References Cited

U.S. PATENT DOCUMENTS

| | | |
|---|---|---|
| 2002/0038159 A1 | 3/2002 | Gass |
| 2004/0031567 A1* | 2/2004 | Engelbart et al. ............. 156/379 |
| 2004/0114133 A1* | 6/2004 | Furiya et al. ................ 356/237.1 |
| 2004/0163227 A1* | 8/2004 | Walt et al. .................. 29/407.02 |
| 2004/0240607 A1* | 12/2004 | Moermond et al. ............ 378/53 |
| 2005/0175217 A1* | 8/2005 | Mueller et al. ................ 382/103 |
| 2005/0201610 A1* | 9/2005 | Hertzman et al. ............ 382/151 |
| 2006/0008150 A1* | 1/2006 | Zhao et al. .................... 382/190 |
| 2006/0069462 A1* | 3/2006 | Cannedy et al. .............. 700/180 |
| 2006/0244953 A1* | 11/2006 | Wei et al. .................... 356/237.1 |
| 2006/0259180 A1* | 11/2006 | Jahn et al. ..................... 700/175 |
| 2007/0104358 A1* | 5/2007 | Komatsu ........................ 382/151 |
| 2008/0115589 A1* | 5/2008 | DeRose et al. .............. 73/862.23 |
| 2008/0250625 A1* | 10/2008 | Slettemoen ................ 29/407.04 |

FOREIGN PATENT DOCUMENTS

| | | | |
|---|---|---|---|
| DE | 10221032 A1 | | 11/2003 |
| EP | 1530107 A2 | | 5/2005 |
| JP | 05138498 A | * | 6/1993 |
| JP | 05185329 A | * | 7/1993 |
| JP | 6-23631 A | | 2/1994 |
| JP | 2000047705 A | * | 2/2000 |
| JP | 2002071487 A | * | 3/2002 |
| JP | 2004-258855 A | | 9/2004 |
| JP | 2005-250990 | | 9/2005 |
| JP | 2007-214212 | | 8/2007 |
| WO | WO 02/30624 A2 | | 4/2002 |
| WO | WO-2005-108013 A1 | | 11/2005 |

OTHER PUBLICATIONS

Official Communication dated Apr. 7, 2009, issued in corresponding European Patent Application No. 07121757.4.

Chinese Office Action dated Sep. 25, 2009, issued in coreesponding Chinese Patent Application No. 200710305319.5.

European Brief Communication dated May 24, 2012 for corresponding European Application No. 07121757.4.

Japanese Office Action mailed Nov. 1, 2011 for corresponding Japanese Application No. 2007-014338, with partial English-language translation.

* cited by examiner

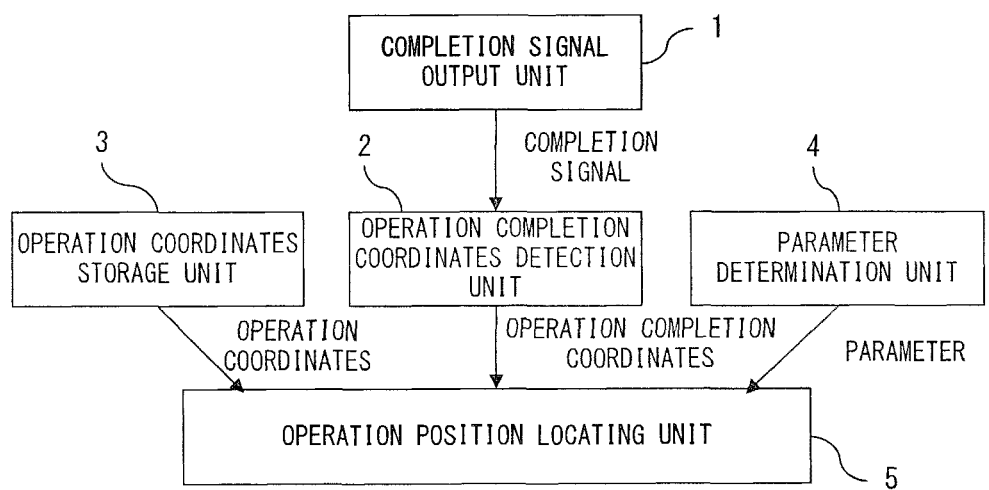
F I G. 1

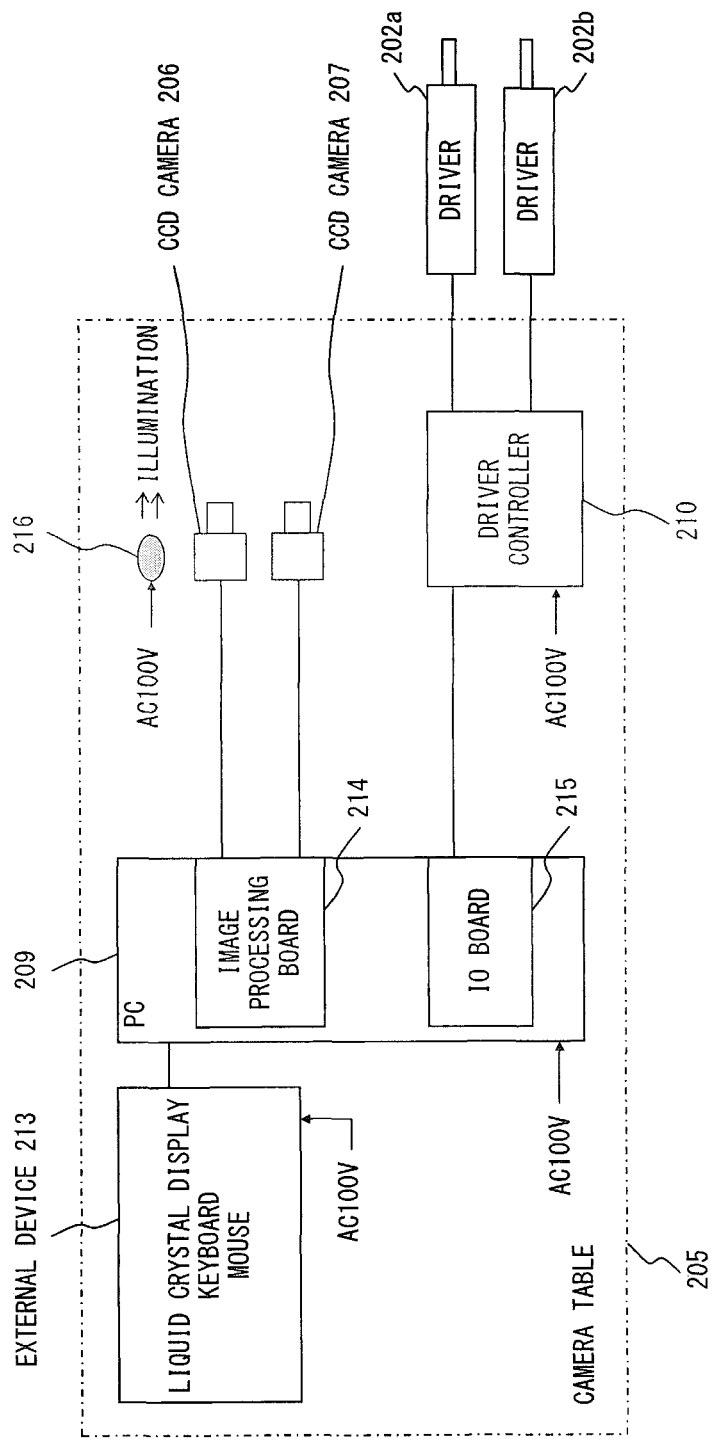
F I G. 5

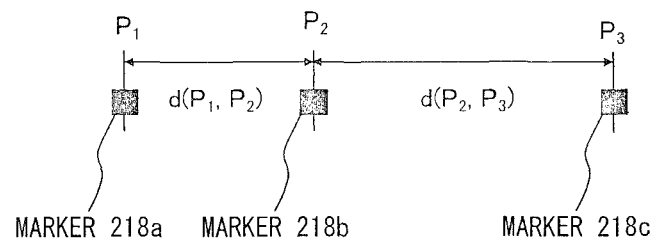
F I G. 8

| $d(P_1, P_2)$ | $d(P_2, P_3)$ | SURFACE TO WHICH DETECTED MARKERS ARE ATTACHED | TOP SURFACE |
|---|---|---|---|
| 10 cm | 90 cm | SURFACE A | SURFACE E |
| 20 cm | 80 cm | SURFACE B | |
| 30 cm | 70 cm | SURFACE C | |
| 40 cm | 60 cm | SURFACE D | |
| 90 cm | 10 cm | SURFACE A | SURFACE F |
| 80 cm | 20 cm | SURFACE B | |
| 70 cm | 30 cm | SURFACE C | |
| 60 cm | 40 cm | SURFACE D | |

F I G. 9

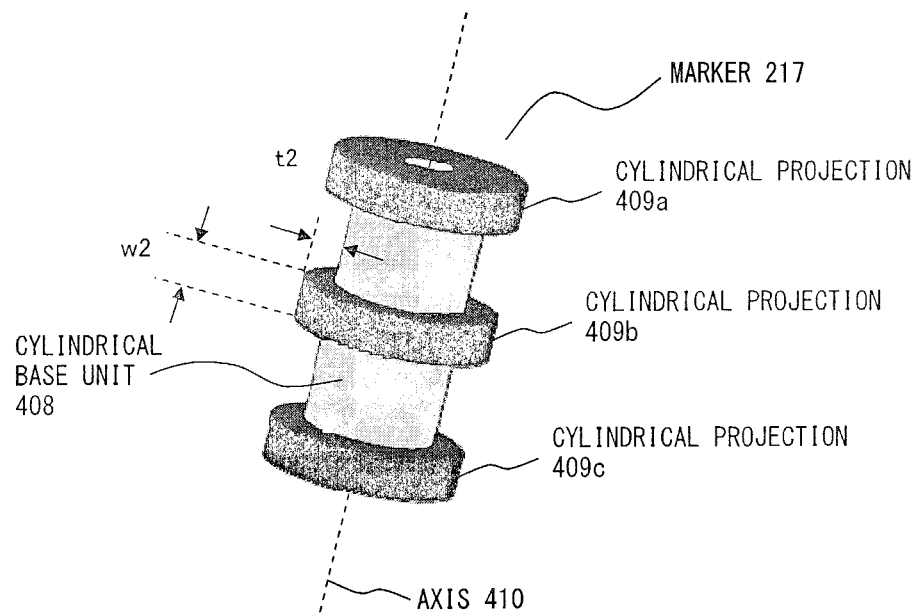
F I G. 1 3 A

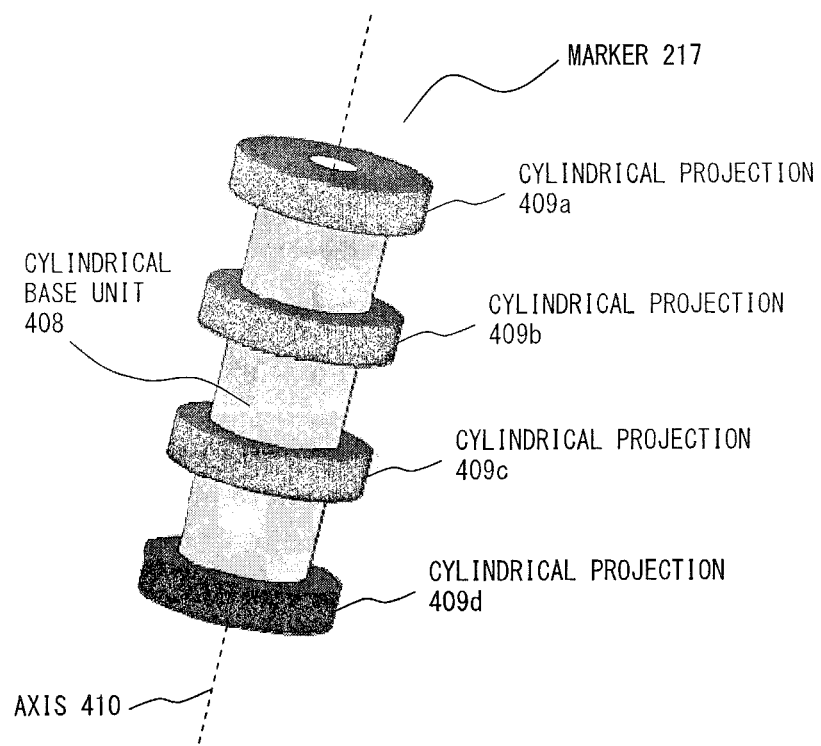
F I G. 1 3 B

SYSTEM, OPERATION CELL, METHOD, PRODUCT MANUFACTURING METHOD, AND MARKER FOR LOCATING OPERATION POSITION

BACKGROUND OF THE INVENTION

1. Field of the Invention

The present invention relates to the technology of locating the position of an operation performed in a manufacturing process of a product.

2. Description of the Related Art

In a manufacturing process of a product requiring a number of operations to be performed by workers, there often occur erroneous operations by a worker forgetting an operation or failing to complete an operation. For example, the manufacturing process of a large electronic equipment unit, a printed circuit board unit, a communication equipment unit, etc. includes an assembly process of parts, and the assembly process includes a number of screwing operations for attaching a part to another part. In the assembly process, erroneous operations frequently occur from screwing operations.

Examples of erroneous operations are stopping a screwing operation before reaching a specified torque of a screw, forgetting to complete a screwing operation after a temporary screwing operation, forgetting to place a screw at a position where the screwing operation is to be performed, etc. Since there are various types of erroneous operations, there are countermeasures to be taken from various viewpoints to reduce the erroneous operations For example, to tighten a screw with a specified torque, it is effective to use a device called a torque driver designed for starting idle running when an applied torque is detected to reach a specified torque. The device is used in an assembly process by a worker or in an assembly process by a robot. The patent document 1 describes a thread fastening device (namely, screwing device) for an assembly process by a robot. The thread fastening device is fixed to the hand of the robot, and detects the coordinates of a screw hole by recognizing an image. When a robot controller corrects the position of the robot based on the coordinates, the thread fastening device drives a nut runner, and tightens the screw while monitoring the applied torque and the driving time.

To reduce erroneous operations of forgetting an operation to be performed, there have conventionally been operation tools such as a screwing counter, an electronic shelf, etc. By using these operation tools, it is possible to compare the number of operations to be performed with the number of operations practically performed and detect forgetting an operation. However, it is not possible only by comparing the numbers to concretely determine which operation has been forgotten. Therefore, it is necessary to visually confirm the point where the screwing operation has been forgotten when inconsistency is detected as a result of the comparing the numbers. At present, there are still a number of erroneous operations even using these operation tools. As a result, there frequently occurs defective manufacture, which requires inspection and repair within a manufacturing process.

Thus, in a manufacturing process to be performed by a number of operations by workers, forgetting operations is a serious problem. The patent document 2 describes a work quality control system for solving the above-mentioned problem. In this work quality control system, a plurality of receivers receive a signal issued by an ultrasonic transmitter attached to the tip of a nut runner. Based on the difference in propagating time of a signal and the positional relation between receivers, the position of the transmitter is located. Since the plurality of receivers are set such that they can keep a predetermined relative positions from a workpiece to be assembled, the position of a tightened screw is detected from the position of the transmitter based on the relationship between the static relative positions. The location information indicating the thus detected position of the tightened screw and the fastening information indicating a result of the comparison between the actually applied torque and the specified torque are managed in combination.

[Patent Document 1] Japanese Published Patent Application No. H6-23631

[Patent Document 2] Japanese Published Patent Application No. 2004-258855

However, there are the following two problems with the system described in the patent document 2.

The first problem is that it is necessary to attach a transmitter of ultrasonic signal or radio signal to a tool. Such necessity cause a problem because the transmitter requires more power, the wiring for supply of power to the transmitter can be the obstacle to an operation, and/or the transmitter can not be attached to some types of existing tools. It is important for an invention for reducing forgetting an operation in a manufacturing process to be easily implemented in the existing manufacturing process.

The second problem is an assumption that it is predetermined that the positional relation between a workpiece and receivers is statically determined. In the product manufacturing process, there are process steps in which the position and the direction of a product in manufacturing is not predetermined. In some process steps, the position and the direction of a product are uncertain until a practical operation is performed due to various reasons including the convenience of a worker, etc. In the case in which one process includes a plurality of operations, the process can be performed with a different position or direction depending on each operation.

SUMMARY OF THE INVENTION

The present invention aims at providing an operation position locating system locating a position on a product where an operation is performed, and especially an operation position locating system provided with at least one of the feature that no signal transmitter is required and the feature that the system can be applied to a case in which the position or direction of a product can be dynamically changed.

It is also an objective of the present invention to provide an operation cell using the operation position locating system, a method performed in the operation position locating system in a manufacturing process of a product, and a program used to direct a computer to perform the method. A marker preferably used in the operation position locating system may also be provided in an embodiment.

An operation position locating system in an embodiment according to the first aspect of the present invention locates a position on a product where an operation is performed in a manufacturing process of the product including one or more operations to be performed using a tool. The operation position locating system comprises an operation completion coordinates detection unit and an operation position locating unit.

The operation completion coordinates detection unit processes a plurality of images obtained by capturing from a plurality of viewpoints a range including an operation completion position as a position on which an operation is completed when the operation is completed, thereby detecting a set of operation completion coordinates representing the operation completion position.

The operation position locating unit obtains a set of operation coordinates representing an operation position as a position on which the operation is to be performed on each of the one or more operations, and locates the operation position corresponding to the operation completion position based on the set of operation completion coordinates and the one or more obtained sets of operation coordinates.

According to the operation position locating system in the embodiment of the first aspect, the operation completion position is detected by image processing, and therefore it is not necessary to provide a signal transmitter to the tool.

An operation position locating system in an embodiment according to the second aspect of the present invention locates a position on a product where an operation is performed in a manufacturing process of the product including one or more operations to be performed using a tool. The operation position locating system comprises an operation completion coordinates detection unit, a parameter determination unit, and an operation position locating unit.

The operation completion coordinates detection unit detects a set of operation completion coordinates in which an operation completion position as a position where the operation is completed is represented by a first coordinate system.

The parameter determination unit detects a position and a direction represented by the first coordinate system of the product or an object having a predetermined positional relation with the product, thereby determines a parameter value required to coordinate transformation between the first coordinate system and a second coordinate system based on the product.

The operation position locating unit obtains a set of operation coordinates in which an operation position as a position where the operation is to be performed is represented by the second coordinate system on each of the one or more operations, transforms coordinates using the parameter to represent the operation completion position and the operation position by a same coordinates system, and locates the operation position corresponding to the operation completion position.

According to the operation position locating system in the embodiment of the second aspect, the operation position corresponding to the operation completion position can be located even if the position and the direction of the product being manufactured can be dynamically changed in the manufacturing process of the product.

The present invention can also be embodied as an operation cell using the operation position locating system in either embodiment according to the first or second aspect of the present invention, a method performed in the operation position locating system in a manufacturing process of a product in either embodiment according to the first or second aspect of the present invention, or a program used to direct a computer to perform the method.

According to the above-mentioned operation position locating systems, the position on the product where an operation has been performed can be located.

Therefore, by using the result of location by the operation position locating system, an operation actually performed can be distinguished from an operation not yet performed in the operations to be performed. Accordingly, it can be automatically checked whether or not there is a missed operation in the manufacturing process. Thus, the number of man-hours for an operation instruction steps and testing process steps to be performed after the manufacturing process can be reduced. In addition, since the frequency of occurrences of defective products caused by forgetting an operation can be reduced, the manufacturing yield can also be enhanced.

BRIEF DESCRIPTION OF THE DRAWINGS

FIG. 1 is a block diagram of the function showing the configuration according to a mode for embodying the operation position locating system of the present invention;

FIG. 5 shows the connection of the electronic equipment relating to the location of an operation position;

FIG. 8 is a schematic chart showing the positional relation of three detected markers;

FIG. 9 shows an example of an arrangement pattern of markers;

FIG. 13A shows an example of a marker to be attached to a driver; and

FIG. 13B shows an example of a marker to be attached to a driver.

DESCRIPTION OF THE EMBODIMENTS

Figure 2:
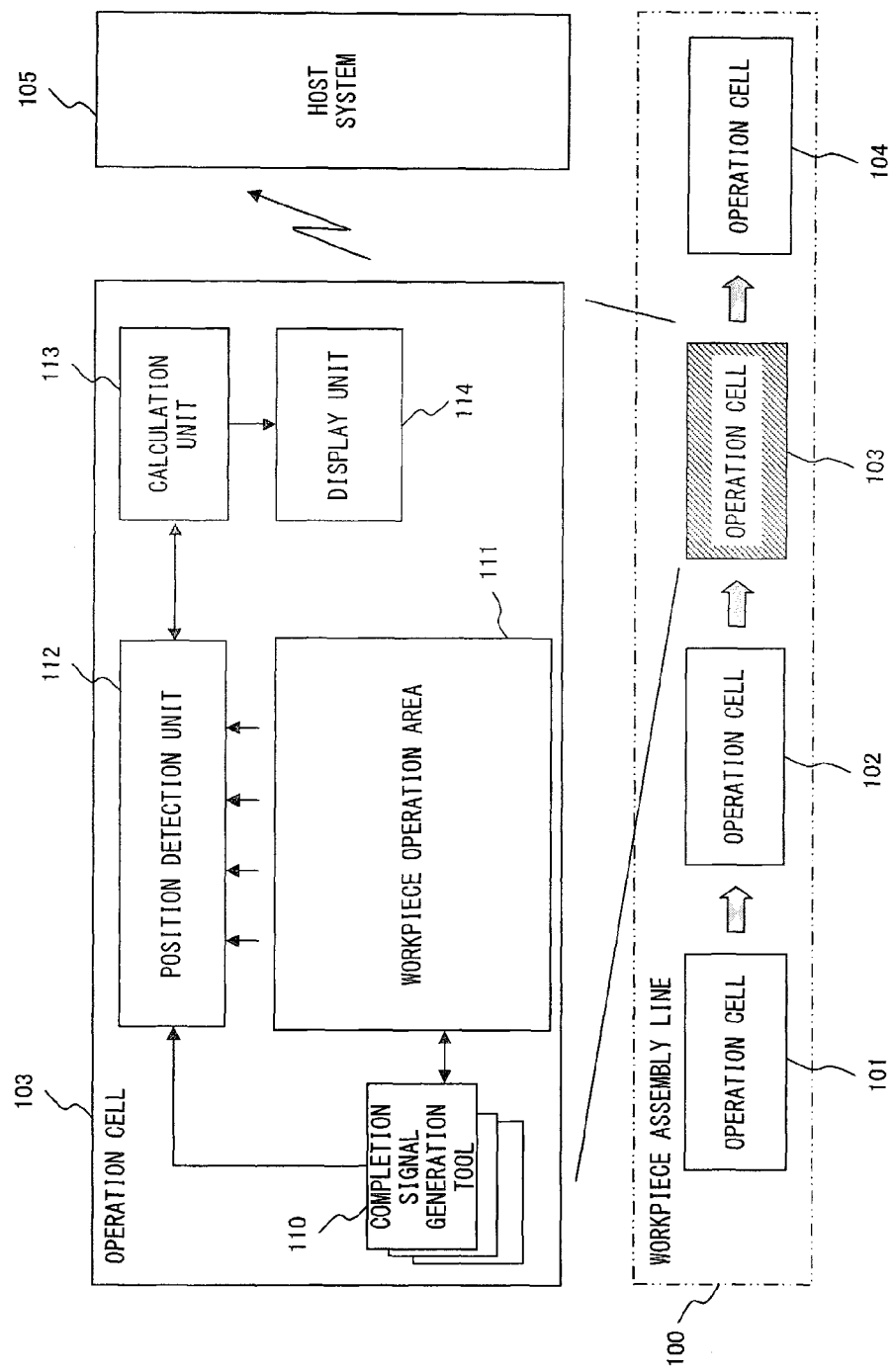
FIG. 2 shows the configuration of the workpiece assembly line including the operation position locating system.

The modes for embodying the present invention are described below in detail with reference to the attached drawings. Embodiments applied to the screwing operation in assembling a printed circuit board unit is mainly described below, but it is obvious that the embodiments of the present invention are not limited with respect to the type of product or operation to which the embodiments of the present invention is applied.

FIG. 1 is a block diagram of the function according to a mode for embodying the present invention of the operation position locating system. In the present embodiment, in the manufacturing process of a product including one or more operations to be performed using a tool, an operation practically performed is distinguished in the operations to be performed by locating the position on the product where the operation has been performed.

When one operation is completed, a completion signal output unit 1 outputs a completion signal, and an operation completion coordinates detection unit 2 receives the completion signal. In the following descriptions, the position where an operation is completed is called an "operation completion position", and the coordinates representing the operation completion position by the fixed and global first coordinate system are called an "operation completion coordinates". In this embodiment, the operation completion position is represented by a triplet of operation completion coordinates because the first coordinate system is a three-dimensional coordinate system.

In more detail, the operation completion position refers to a position of a target of an operation when the operation is completed. For example, the target of a screwing operation is a screw, and the position of the screw when the operation is completed is the operation completion position. To be more correct, the position of a specific point of a screw predetermined as indicating the representative position of the screw is the operation completion position. When the screwing operation is performed, the tip of the driver contacts the screw, and the operation completion position is also the position where the tool contacts the target of the operation when the operation is completed.

Since the time required to propagate a completion signal is so short as to be ignored without any problem, the position where the operation is being performed when the operation completion coordinates detection unit 2 receives the completion signal can be regarded as the operation completion position. The operation completion coordinates detection unit 2 detects an operation completion coordinates when it receives the completion signal.

In the present mode for embodying the present invention, the position of a marker attached to a tool is detected in the image recognizing process, and the operation completion coordinates are calculated from the position of the marker, thereby detecting the operation completion coordinates. A marker can be made of resin or rubber, and can be easily attached to a tool with an adhesive. In the image recognizing process, a plurality of images captured from a plurality of different viewpoints are used. The plurality of images are images which capture the range including the operation completion position. Typically, two images are used, and the operation completion coordinates are calculated on the basis of the principle of stereo vision.

The position where each operation should be performed is predetermined. The position is hereinafter referred to as an "operation position". In more detail, the coordinates of the operation position represented by the local second coordinate system based on a product is predetermined depending on the product to be manufactured. The coordinates are hereinafter called "operation coordinates". In this embodiment, the operation position is represented by a triplet of operation coordinates because the second coordinate system is also a three-dimensional coordinate system.

The operation coordinates are determined when a product is designed, and indicate an ideal position without an error, that is, a nominal position. An actual operation may be accompanied by an error, and may be performed at a position a little displaced from an operation position.

An operation coordinates storage unit 3 stores a set of operation coordinates of each operation. Specifically, in this embodiment, each triplet of operation coordinates for each operation is stored in the operation coordinates storage unit 3. The operation coordinates can also be stored in the operation coordinates storage unit 3 in advance, and can be externally provided as necessary and stored in the operation coordinates storage unit 3.

A parameter determination unit 4 detects the position and direction represented by the first coordinate system of a product or an object such as an operation table etc. having a predetermined positional relation with the product, and determines the value of a parameter required for coordinate transformation between the first coordinate system and the second coordinate system. The coordinate transformation can be a transformation from the coordinates in the first coordinate system to the coordinates in the second coordinate system, or can be the inverse transformation, namely, a transformation from the second coordinate system to the first coordinate system. However, the former is more effective and preferable as described later.

An operation position locating unit 5 performs the coordinate transformation for representing both operation completion position and operation position in the same coordinates system using a parameter determined by the parameter determination unit 4, and locates (namely, identifies) the operation position corresponding to the operation completion position.

For example, in the mode for embodying the present invention for transforming the coordinates in the first coordinate system to the coordinates in the second coordinate system, the operation completion coordinates detected by the operation completion coordinates detection unit 2 are transformed to the coordinates in the second coordinate system by the operation position locating unit 5. The operation position locating unit 5 reads the operation coordinates represented in the second coordinate system from the operation coordinates storage unit 3, and locates the operation position corresponding to the operation completion position based on the read operation coordinates and the transformation result.

In a case where the operation position locating unit 5 transforms the coordinates in the second coordinate system to the coordinates in the first coordinate system, it is obvious that the operation position locating unit 5 can locates the operation position corresponding to the operation completion position in the similar method.

With the above-mentioned configuration, each time an operation is completed, the parameter indicating the relationship between the first coordinate system and the second coordinate system is dynamically calculated. Thus, the operation position and the operation completion position can be represented and compared in the same coordinates system even if the position and the direction of a product can be dynamically changed when an actual operation is performed. Therefore, the operation position corresponding to a completed operation can be located. As a result, the completed operation in the operations to be performed can be discriminated.

FIG. 2 shows the configuration of the workpiece assembly line including the operation position locating system. Each block shown in FIG. 2 is a functional block.

The product to be manufactured is assembled by a workpiece assembly line 100. The workpiece assembly line 100 includes a plurality of operation cells 101 through 104. One process step of the assembly process of a product corresponds to one operation cell.

The product being assembled is hereinafter referred to as a "workpiece". A workpiece is fed to the operation cells 101, 102, 103, and 104 sequentially. Each operation cell is preassigned one or more operations to be performed on a workpiece. That is, one process step includes one or more predetermined operations. The operations can be, for example, a screwing operation. A worker in charge of each operation cell performs an assigned operation (or assigned operations), and when the operation(s) in the assembly operation cell is/are completed, the worker feeds the workpiece to the next operation cell. In another embodiment the worker may be replaced with a machine such as a robot.

Each process step of the workpiece assembly line 100 is managed by a host system 105 in an upper layer. The host system 105 manages the progress of each workpiece, that is, in which operation cell the workpiece is being processed, and which operation in the operations to be completed in the operation cell has been completed. The data relating to the progress is transmitted to the host system 105 from each operation cell. When a plurality of products are manufactured, the host system 105 also manages the entire progress including the number of products to be manufactured, the number of completed products, and the progress of each of the uncompleted workpieces.

A plurality of operation cells 101 through 104 are different in contents of operation, but are the same in basic configuration. In FIG. 2, the operation cell 103 is enlarged and shown in detail.

In the operation cell 103, a worker performs a determined operation using a tool provided with a completion signal generation tool 110 on a workpiece placed in a workpiece operation area 111. The completion signal generation tool 110 generates a signal when an operation is completed, and is a practical example of the completion signal output unit 1 shown in FIG. 1. An operation table can be provided for the workpiece operation area 111.

A completion signal can be any signal capable of indicating the timing with which an operation is completed. For example, the completion signal can be any of an electric signal, an ultrasonic signal, and an optical signal, and can be transmitted by cable or by wireless. The completion signal can be a simple pulse, or a signal indicating data of the date and time or meaning "completion" because any signal generated when an operation is completed can be used as a completion signal since there is no problem when the reception time of the completion signal is regarded as the time when the operation is completed. Whatever a completion signal is, the next process, that is, the process by a position detection unit 112, is performed when the completion signal is received, The position detection unit 112 includes the operation completion coordinates detection unit 2, the operation coordinates storage unit 3, the parameter determination unit 4, and the operation position locating unit 5 shown in FIG. 1. The position detection unit 112 receives a completion signal from the completion signal generation tool 110, and when the completion signal is received, detects the operation completion coordinates, calculates a coordinate transformation parameter, and locates the operation position corresponding to the completed operation. A calculation unit 113 integrates the data processed in the operation cell 103, and the data transmitted and received between the operation cell 103 and the host system 105.

A display unit 114 displays various types of information for a worker. The word "display" includes both visual and audio display. That is, the display unit 114 can be a display device such as a liquid crystal display, a speaker, and a combination of them. The information displayed by the display unit 114 includes guidance to an operation to be performed, the information about the operation for which the operation position is located by the position detection unit 112, the progress of an operation, etc.

Figure 3:
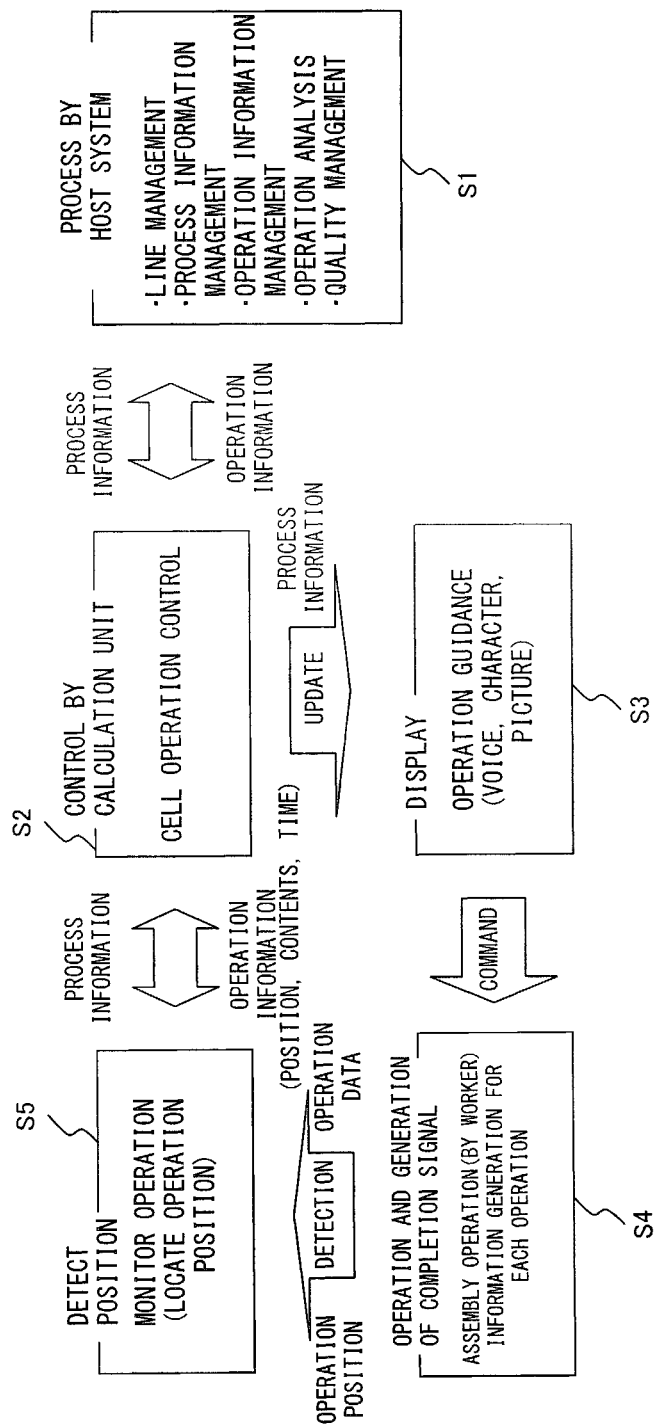
FIG. 3 is a schematic chart showing the flow of the process in an operation cell.

FIG. 3 is a schematic chart showing the flow of the process in an operation cell. In FIG. 3 as in FIG. 2, the case of the operation cell 103 is described.

As shown in step S1, the host system 105 constantly performs various processes during the operation of the workpiece assembly line 100. On the other hand, in the operation cell 103, the processes in steps S2, S3, S4, and S5 are performed in this order on each of N operations (N>1) to be performed in the process of the operation cell 103. That is, the loop of the steps S2 through S5 is repeatedly performed N times. During the runtime in step S2, the information is transmitted and received between the operation cell 103 and the host system 105. In more detail, the flow of the process in FIG. 3 is described below.

When a workpiece is transmitted from the operation cell 102 for the immediately before process to the operation cell 103 for the current process, the calculation unit 113 receives data of the operation information from the host system 105 in step S2. The "operation information" refers to the information about the operation(s) to be performed in the operation cell 103. The operation information includes predetermined information such as the number N of operations (N>1) to be performed in the operation cell 103, the operation position and type of each of the N operations, etc. The operation position is represented by the set of operation coordinates (e.g., the triplet of operation coordinates) in the second coordinate system, and the type of operation can be a screwing operation, a soldering operation, etc.

When step S2 is firstly performed on a certain workpiece, the calculation unit 113 can generate the process information having the contents that "None of N operations has been completed", and transmit it to the host system 105. The "process information" refers to the information representing the progress of the operation(s) in the operation cell 103. The process information includes the information about, for example, which operation in the N operations has been completed. In the second and subsequent operations in step S2, the calculation unit 113 transmits to the host system 105 the process information about which operation has been completed immediately before.

In step S2, the calculation unit 113 further issues an instruction to the display unit 114 to display the guidance to the operation to be performed by the worker using voice, characters, pictures, etc. on the basis of the updated operation information and process information. Thus, the calculation unit 113 performs various types of control relating to the operation in the operation cell 103. Step S3 is a display step performed by the display unit 114 at a given instruction.

Next, in step S4, the worker performs an operation at an instruction of the guidance displayed by the display unit 114. Since the present mode for embodying the invention is to process the workpiece assembly line 100, the operation by the worker is an assembly operation, and is practically, for example, a screwing operation. When one operation is completed, the completion signal generation tool 110 of the equipment used for the operation generates a completion signal. The completion signal indicates the information that one operation has been completed.

The position detection unit 112 monitors the generation of a completion signal. In step S5, the position detection unit 112 receives a completion signal, and upon receipt of the signal, detects the operation completion coordinates, determines a parameter for coordinate transformation, performs the coordinate transformation, and locates an operation position. As described above, the operation information received by the calculation unit 113 from the host system 105 includes the set of operation coordinates of each of the N operations. Therefore, the position detection unit 112 receives the data of the operation coordinates from the calculation unit 113, and refers to the data, thereby locating the operation position.

Then, the position detection unit 112 transmits the information about the operation whose operation position has been located to the calculation unit 113. In the following descriptions, the information about the operation actually performed is also called the "operation information". In step S5, the operation information transmitted from the position detection unit 112 to the calculation unit 113 can be, for example, a serial number (S/N) as an identifier for identification of each operation, a receiving time of a completion signal as the completion time of operation, etc.

Control is returned to step S2 after step S5. To locate the operation position is to identify which operation has been performed in the N operations. Thus, completing one operation corresponds to a change in progress. Therefore, upon receipt of the operation information from the position detection unit 112, the calculation unit 113 updates the process information according to the received operation information in step S2, and transmits the updated process information to both the display unit 114 and the host system 105.

If the updated process information indicates that all of the N operations to be performed in the operation cell 103 have been completed, then the calculation unit 113 instructs the display unit 114 to display the information about the completion. The worker recognizes the display, and transmits a workpiece to the operation cell 104 in the next process. Otherwise, since there still remain one or more operations to be performed in the operation cell 103, the above-mentioned processes are repeated.

As described above, the updated process information is transmitted to the host system 105 each time the worker completes one operation. As shown in step S1 in FIG. 2, the host system 105 manages the entire workpiece assembly line 100, manages the process information and the operation information about each workpiece, performs various analyses of operation, manages the quality of a product assembled by the workpiece assembly line 100, etc.

Figure 4:
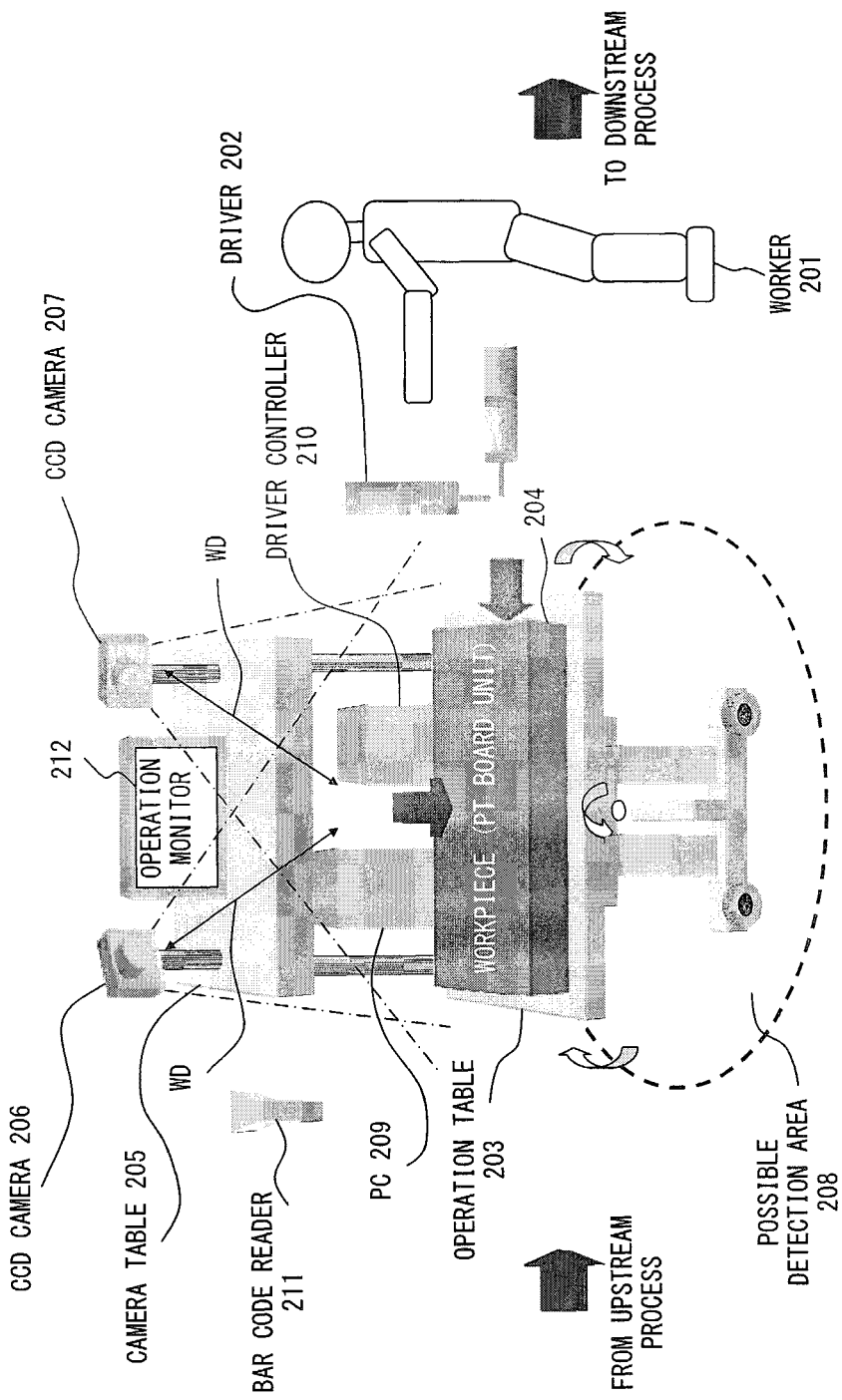
FIG. 4 is a perspective view showing the configuration of the operation cell according to a mode for embodying the present invention.

Next, an example of a more practical configuration of the operation cell 103 is described below with reference to FIGS. 4 and 5. FIG. 4 is a perspective view of the configuration of the operation cell 103 according to a mode for embodying the present invention.

The operation cell 103 is attended by a worker 201 who performs one or more necessary operations on a workpiece 204 fixed to an operation table 203. The workpiece 204 in the example shown in FIG. 4 is a printed circuit board (Pt board) unit. For simple explanation, the following definitions are provided.

N indicates the number of operations to be processed in the process of the operation cell 103.

All of N operations are screwing operations by a driver 202.

The driver 202 is a power-driven torque driver for which a specified torque can be set. The driver 202 is configured to idle and output a completion signal when the actually applied torque reaches a set specified torque.

The same value of the specified torque is assigned to the screwing operations for the N screws, and the value is set in advance in the driver 202.

FIG. 4 shows two pictures of the driver 202. It does not show two drivers 202, but shows the case in which the driver 202 is laid horizontally and tightens a screw from the side, and the case in which the driver 202 is set vertically and tightens a screw from above. The arrow from above the workpiece 204 toward the top surface of the workpiece 204 and the arrow from the right side of the workpiece 204 toward the right side surface of the workpiece 204 indicate the screwing directions. Although not shown in the attached drawings, it is obvious that there is the case in which the driver 202 is tilted and tightens a screw.

The operation table 203 has a table plate and leg portions, and the leg portions are provided with wheels so that the operation table 203 can be moved. The table plate of the operation table 203 can be rotated on the horizontal axis to exchange between the top surface and the reverse, and can be rotated on the vertical axis to change the directions. The movable operation table 203 is widely used in order to facilitate the worker 201 performing a plurality of operations without large changes of his/her position even if the workpiece 204 is large.

The workpiece 204 is fixed to the table plate of the operation table 203. Depending on the model of product to be manufactured, the position of the workpiece 204 fixed on the table plate of the operation table 203 is predetermined. Therefore, the position and the direction of the workpiece 204 are uniquely determined from the position and the direction of the table plate of the operation table 203.

An antivibration camera table 205 is placed near the operation table 203, and two CCD (charge coupled device) cameras 206 and 207 are placed on the camera table 205. As it is well known as the principle of stereo vision, the position of a captured object can be calculated using two images obtained by capturing the same object from different positions. A possible detection area 208 is an area in the operation cell 103 and is defined as an area in which the position of an object can be calculated by the stereo vision using the CCD cameras 206 and 207.

The range of the possible detection area 208 depends on the specifications and the setting positions of the CCD cameras 206 and 207. Therefore, it is desired to appropriately determine the specifications and the setting positions of the CCD cameras 206 and 207 depending on the movable range of the operation table 203 such that the possible detection area 208 can constantly include the workpiece 204. In this mode for embodying the present invention, the CCD cameras 206 and 207 are provided diagonally above the workpiece 204 in order to enhance the detection accuracy of the position by the stereo vision. The "WD" shown in FIG. 4 is short for "working distance", and is used to refer to the distance of the range in which the distance can be calculated by the stereo vision.

The operation cell 103 further includes a PC (personal computer) 209, a driver controller 210, a bar code reader 211, and an operation monitor 212. The setting locations of the PC 209 and the driver controller 210 are optionally determined, but they are set in the space below the camera table 205 in FIG. 4. The operation monitor 212 is set on the camera table 205 so that the display contents such as the guidance to the operations to be performed can be easily checked by the worker 201.

The PC 209 performs various calculations. The PC 209 is a common computer provided with, for example, a CPU (central processing unit), ROM (read only memory), RAM (random access memory), a communication interface for cable transmission and/or wireless communication, an external storage device, and a drive device of a portable storage medium. These components are connected via a bus. The external storage device can be, for example, a magnetic disk device such as a hard disk drive etc., a rewritable non-volatile memory, etc.

The driver controller 210 is connected to the driver 202 by wiring or wireless communication path not shown in FIG. 4, and receives a signal transmitted from the driver 202. The driver controller 210 has the function of a driver counter of counting the number of signals received from the driver 202.

It is preferable that the bar code reader 211 is a handheld unit. The worker 201 allows the bar code reader 211 to read the ID of the worker 201, the S/N, chart numbers, etc. of the workpiece 204. The bar code indicating the ID of the worker 201 is printed on, for example, the staff card carried by the worker 201. The barcode indicating the S/N and the chart number of the workpiece 204 is printed on, for example, a sheet of paper to be transmitted with the workpiece 204 in each process. The paper with the bar code printed on can also be attached to the workpiece 204.

The bar code reader 211 is connected to the PC 209 through the wiring or wireless communication path not shown in FIG. 4. The data indicated by the bar code read by the bar code reader 211, that is, the data of the ID of the worker 201 and the S/N and the chart number of the workpiece 204, is transmitted to the PC 209, and transmitted from the PC 209 to the host system 105 not shown in FIG. 4.

Since the operation table 203 is movable, it is not necessary for the worker 201 to frequently change his or her position in the operation cell 103. Therefore, in the following descriptions, it is assumed that there is no worker 201 between the camera table 205 and the operation table 203. That is, it is assumed that the operation table 203 and the workpiece 204 are taken, without being interrupted by an obstacle, in both of the two images captured by the CCD cameras 206 and 207.

The correspondence between FIGS. 1 and 4 is described below. The completion signal output unit 1 corresponds to the driver 202 and the driver controller 210. The operation completion coordinates detection unit 2 corresponds to the CCD cameras 206 and 207 and the PC 209. The operation coordinates storage unit 3 corresponds to the RAM or the external storage device of the PC 209. The parameter determination unit 4 corresponds to the CCD cameras 206 and 207 and the PC 209. The operation position locating unit 5 corresponds to the PC 209.

The correspondence between FIGS. 2 and 4 is described below. The completion signal generation tool 110 corresponds to the driver 202 and the driver controller 210. The position detection unit 112 corresponds to the CCD cameras 206 and 207 and the PC 209. The calculation unit 113 corresponds as the PC 209, and the display unit 114 corresponds to the operation monitor 212.

That is, the two functions blocks, that is, the position detection unit 112 and the calculation unit 113, share the PC 209 as hardware. The PC 209 functions as a part of the position detection unit 112 and the calculation unit 113 by the CPU executing the program stored in the external storage device or the ROM. The program can be provided through a network such as the LAN (local area network) to which the PC 209 is connected through the communication interface or the Internet. Otherwise, the portable storage medium storing the program can be set in the drive device, and the program can be loaded into the RAM to be executed by the CPU. The portable storage medium can be various types of storage media including an optical disk such as a CD (compact disc), a DVD digital versatile disk), etc., a magneto optical disk, a magnetic disk such as a flexible disk, etc.

FIG. 5 shows the connection of electronic equipment relating to the location of an operation position in the electronic equipment in the operation cell 103 shown in FIG. 4. The connection shown in FIG. 5 can be performed by cable and by wireless.

The CCD cameras 206 and 207, the driver controller 210, and various external devices 213 including a liquid crystal display for the operation monitor 212 are connected to the PC 209. An external device 213 can also include a keyboard and a mouse for input by the worker 201. FIG. 4 shows the case in which only one driver 202 is used. As shown in FIG. 5, two drivers 202a and 202b can be connected to the driver controller 210. In some modes for embodying the present invention, it is necessary to use a plurality of drivers depending on the type of screws.

To guarantee the necessary brightness in shooting an image using the CCD cameras 206 and 207, an illumination unit 216 not shown in FIG. 4 is used.

In the example shown in FIG. 5, the external device 213, the PC 209, the driver controller 210, and the illumination unit 216 are connected to the power supply of AC (alternating current) 100V. The power is supplied to the drivers 202a and 202b through the driver controller 210, and to the CCD cameras 206 and 207 through the PC 209. The path for supplying the power is not limited to the configuration shown in FIG. 5.

As shown in FIG. 5, the PC 209 according to the present mode for embodying the present invention is provided with an image processing board 214 and an IO (input/output) board 215. The data of the image captured by the CCD cameras 206 and 207 is received and processed by the image processing board 214. The CPU of the PC 209 performs the process using the result of the above-mentioned process by the image processing board 214. The signals transmitted from the drivers 202a and 202b are transmitted to the PC 209 through the driver controller 210, and received by the IO board 215.

The signals transmitted by the drivers 202a and 202b to the driver controller 210 are not limited to completion signals. For example, when a screwing operation fails, the worker 201 reverses the driver 202a or 202b to loosen a screw. At this time, the driver 202a or 202b transmits a reverse notification signal to the driver controller 210. Then, the reverse notification information is transmitted from the driver controller 210 to the PC 209, and received by the IO board 215. Upon receipt of the reverse notification signal, the PC 209 performs a necessary process. For example, the PC 209 locates the operation position of the screwing operation corresponding to the loosened and removed screw in the similar procedure performed when the completion signal is received.

Next, with reference to FIGS. 6 through 10, the process of locating the operation position of the completed operation is described below in detail.

Figure 6:
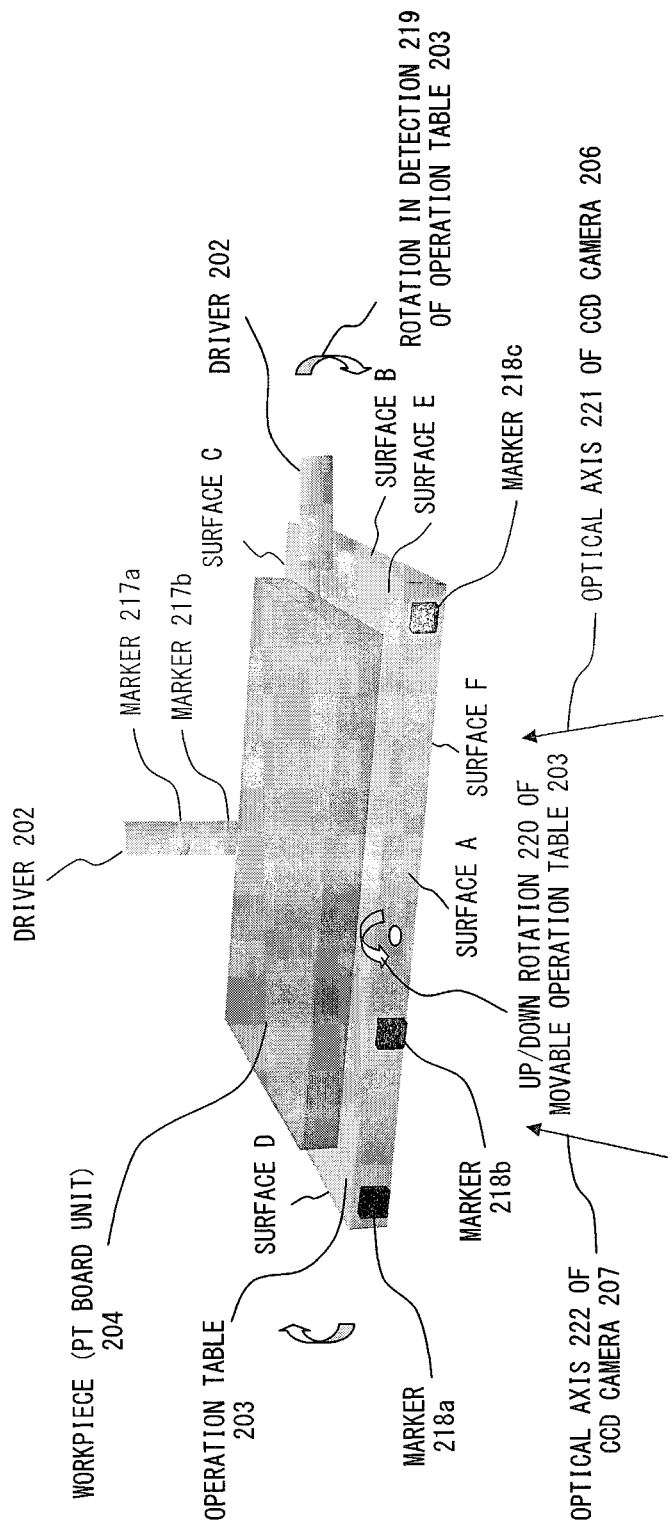
FIG. 6 is a schematic and perspective view showing the details obtained by enlarging a part of FIG. 4.

FIG. 6 is a perspective view as a schematic chart showing in detail an enlarged view of a part of FIG. 4. However, in FIG. 6, the viewpoint is located in the opposite position as compared with FIG. 4. In FIG. 4, the CCD cameras 206 and 207 are shown at the back, but they are located at the front although not shown in FIG. 6, and the two arrows indicating an optical axis 221 of the CCD camera 206 and an optical axis 222 of the CCD camera 207 are directed from the front to the back.

As in FIG. 4, FIG. 6 shows both the case in which the driver 202 is laid horizontal and the case in which it is set vertically. The handle portion of the driver 202 is provided with markers 217a and 217b. The attached positions of the markers 217a and 217b are known by attaching them at predetermined positions or measuring the attachment positions after attaching them at appropriate positions. In the example below, when each marker is not to be discriminated, one or more of the markers are referred to by the reference numeral "217".

The table plate of the operation table 203 is a rectangular parallelepiped. In the following descriptions, the surfaces of the rectangular parallelepiped are referred as surfaces A, B, C, D, E, and F. In FIG. 6, the surface A is a front surface, the surface B is a right side surface, the surface C is a back surface, the surface D is a left side surface, the surface E is a top surface, and the surface F is a bottom surface. Only the surfaces A, B, and E can be seen. Since the operation table 203 can rotate on the vertical axis, the surface A is not always a front surface. Since the operation table 203 can rotate also on the horizontal axis, the surface E is not always a top surface. The workpiece 204 is fixed to the surface E or F.

Three markers 218a, 218b, and 218c are attached to the surface A. Although not shown in FIG. 6, the three markers are similarly attached to the surfaces B, C, and D. In the following descriptions, when it is not necessary to discriminate the markers, the reference numeral "218" is used to designate one or more markers if each marker need not be discriminated. It is predetermined in which positions the surfaces A through D are provided with the markers.

In FIG. 6, the workpiece 204 is fixed to a predetermined position on the surface E. The position in which the workpiece 204 is fixed is predetermined depending on the model of the workpiece 204. Therefore, the position and direction of the workpiece 204 can be uniquely calculated by the position and direction of the operation table 203.

Next, the method of calculating the position and direction of the driver 202 and those of the table plate of the operation table 203 from the position of the marker calculated by the stereo vision algorithm is described below. First, in preparation for the description, the terms (a) through (f) are defined below.

(a) Right Camera Coordinate System and Left Camera Coordinate System

The coordinate system of the image captured by the CCD cameras 206 and 207 is respectively referred to as a "right camera coordinate system" and a "left camera coordinate system". The right camera coordinate system and the left camera coordinate system are both two-dimensional coordinate systems. Accordingly, a point is represented by a pair of coordinates in these coordinate systems. Since the CCD cameras 206 and 207 are mounted in different positions, the coordinates of an object on the right camera coordinate system and the coordinates of the same object on the left camera coordinate system are different.

(b) Absolute Coordinate System

The global three-dimensional coordinate system in which the position of the origin and the directions of the axes are fixed is referred to as an "absolute coordinate system", and referred to by reference characters "$\Sigma a$". The coordinates calculated by the stereo vision algorithm using two images captured by the CCD cameras 206 and 207 are the coordinates (more specifically, a triplet of coordinates) on the absolute coordinate system $\Sigma a$. The CCD cameras 206 and 207 are fixed and mounted on the antivibration camera table 205 fixed to be appropriate in calculating the coordinates on the absolute coordinate system $\Sigma a$.

In the present mode for embodying the present invention, the absolute coordinate system $\Sigma a$ is a three-dimensional orthogonal coordinate system, and the three axes are an x axis, a y axis, and a z axis. The absolute coordinate system $\Sigma a$ is a practical example of the first coordinate system described with reference to FIG. 1. The triplet of coordinates on the absolute coordinate system $\Sigma a$ representing the position of an optional point $P_i$ is expressed by the row vector $^a p_i$ of the equation (1).

$$^a p_i = (x_i, y_i, z_i) \qquad (1)$$

(c) Operation Table Coordinate System

The local three-dimensional coordinate system on the basis of the table plate of the operation table 203 is called an "operation table coordinate system". The operation table coordinate system is a coordinate system in which the origin moves with the movement of the operation table 203, and the directions of the axes change with the rotation of the table plate of the operation table 203.

(d) Workpiece Coordinate System

The local three-dimensional coordinate system on the basis of the workpiece 204 is called a "workpiece coordinate system", and referred to by reference characters "$\Sigma w$". The workpiece coordinate system is a coordinate system in which the origin moves with the movement of the workpiece 204, and the directions of the axes change with the rotation of the workpiece 204.

In the present mode for embodying the present invention, the workpiece coordinate system $\Sigma w$ is a three-dimensional orthogonal coordinate system, and the three axes are a q axis, an r axis, and an s axis. The workpiece coordinate system $\Sigma w$ is a practical example of the second coordinate system described with reference to FIG. 1. The triplet of coordinates on the workpiece coordinate system $\Sigma w$ of the point $P_i$ is expressed by the row vector $^w p_i$ of the equation (2).

$$^w p_i = (q_i, r_i, s_i) \qquad (2)$$

(e) Coordinate Transformation

In each of the above-mentioned coordinate systems, (a) and (c) are auxiliary coordinate systems, and (b) through (d) can be mutually transformed, but the present mode for embodying the present invention is focused on the transformation from the absolute coordinate system $\Sigma a$ to the workpiece coordinate system $\Sigma w$. The transformation from the absolute coordinate system $\Sigma a$ to the workpiece coordinate system $\Sigma w$ can be expressed by the equation (3) using the 4×4 matrix A. "T" is a symbol representing the transpose.

$$(q_i, r_i, s_i, 1)^T = A(x_i, y_i, z_i, 1)^T \qquad (3)$$

Each element of the matrix A is a parameter for the coordinate transformation from the absolute coordinate system $\Sigma a$ to the workpiece coordinate system $\Sigma w$, and is a practical example of a necessary parameter for the coordinate transformation between the first coordinate system and the second coordinate system described with reference to FIG. 1. As described above, since the operation table 203 to which the workpiece 204 is fixed is movable, each value of the element of the matrix A dynamically changes depending on the position and direction of the operation table 203.

(f) Distance Between Two Points

The Euclid distance between the points $P_i$ and $P_j$ is expressed by "$d(P_i, P_j)$". The coordinate systems (b) through (d) are coordinate systems for a three-dimensional space in the real world, and the distance is the same when calculated in any coordinate system.

Figure 7:
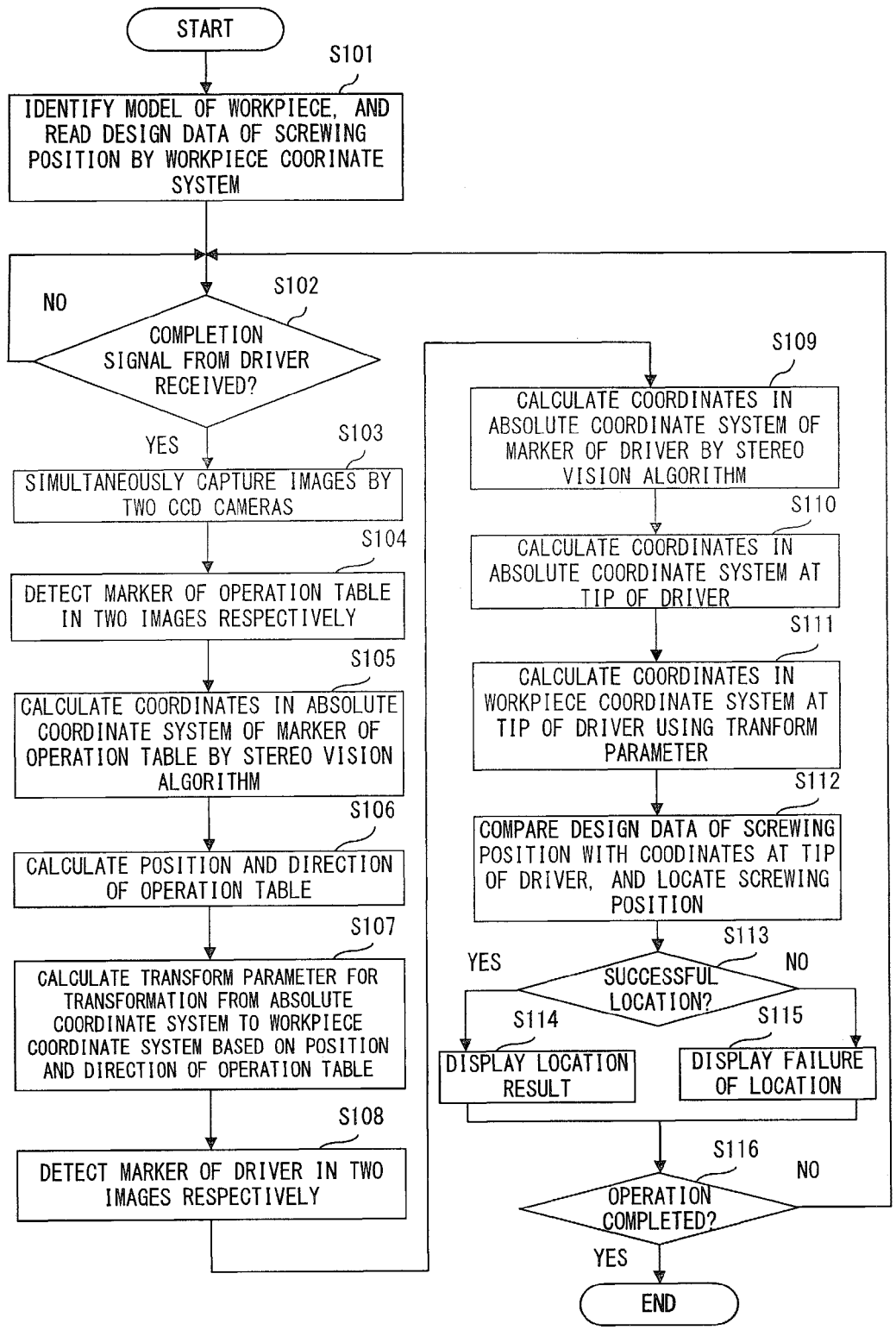
FIG. 7 is a flowchart of the flow of the process according to a mode for embodying the present invention.

Next, using the terms defined as described above, the process performed in the operation position locating system shown in FIGS. 2 and 4 is described in detail with reference to FIGS. 7 through 10. FIG. 7 is a flowchart showing the flow of the process according to a mode for embodying the present invention. As similar as FIG. 2, the following description is focused on the process in the operation cell 103.

First, in step S101, the workpiece 204 is transmitted to the operation cell 103 from the operation cell 102 in the process immediately before. By the worker 201 allowing the bar code reader 211 to read the bar code representing the model of the workpiece 204, the PC 209 functioning as the calculation unit 113 detects that the workpiece 204 has been transmitted, and is informed of the model of the workpiece 204. The PC 209 transmits a code indicating the model as a retrieval key (namely, search key) to the host system 105, and reads the operation information about the model from the host system 105. The operation information includes the coordinates on the workpiece coordinate system $\Sigma w$ at the screwing position of N screws. These coordinates are determined when the workpiece 204 is designed, and are the operation coordinates described above with reference to FIG. 1.

Next, in step S102, the PC 209 monitors whether or not a completion signal has been received. The process in step S102 is repeatedly performed until a completion signal is received. When the completion signal is received, control is passed to step S103. A practical example of the completion signal is a torque-up signal indicating that the actually applied torque has reached a specified torque. The torque-up signal is transmitted from the driver 202 to the PC 209 through the driver controller 210 and the IO board 215.

In step S103, the CCD cameras 206 and 207 simultaneously capture the operation cell 103. The data of the two captured images is fetched to the image processing board 214 in the PC 209. Thus, the necessary data in detecting the positions and the directions of the workpiece 204 and the driver 202 at the moment when the reception of the completion signal is detected is reserved.

Next, in step S104, on each of the two images captured by the CCD cameras 206 and 207, the image processing board 214 detects the positions of the markers 218 attached to the operation table 203 in the image recognizing process.

As described above, the images captured by the CCD cameras 206 and 207 includes the operation table 203 and the workpiece 204 without any obstacle such as the worker 201 etc. Therefore, at least one of the surfaces A through D is captured in the image with the three attached markers 218. Thus, the image processing board 214 is expected to detect at least three markers 218 in the data of each of the two images.

In the following description, for explanation convenience, the positional relation shown in FIG. 6 is assumed, and it is assumed that the markers 218a through 218c have been detected in step S104. However, at the stage in steps S104 and S105, it is not determined that the detected three markers 218 are the markers 218a through 218c attached to the surface A.

In the descriptions below, the respective central positions of the markers 218 indicate the respective positions of the markers 218. In step S104, the coordinates in the right camera coordinate system and those in the left camera coordinate system at the central positions of the markers 218a through 218c are detected.

In some cases, two adjacent surfaces such as the surfaces A and B appear in an image, and the image processing board 214 can detect six markers 218. On each surface, since the markers 218 are attached on one straight line, three markers 218 are arranged on a straight line in each image, and other three markers 218 are arranged on another straight line. The image processing board 214 detects these two straight lines so that the six markers 218 can be grouped into those attached to one surface and those attached to another surface. Only one group can be used or both groups can be used in the following processes in steps S105 and S106. In the following descriptions, it is assumed for simple explanation that only one group including the markers 218a through 218c is used.

In the next step S105, the PC 209 calculates the coordinates in the absolute coordinate system Σa of each of the detected markers 218 by the stereo vision algorithm. The calculated values of the coordinates in the right camera coordinate system and the left camera coordinate system of each of the markers 218 obtained in step S104 are used in the calculation in step S105. That is, in this example, the coordinates $^{a}p_1$, $^{a}p_2$, $^{a}p_3$ of the absolute coordinate system Σa of each of the respective positions $P_1$, $P_2$, $P_3$ of the markers 218a, 218b, and 218c are calculated.

In the next step S106, the PC 209 calculates the position and the direction of the operation table 203 represented by the absolute coordinate system Σa. The calculating method is described below with reference to FIGS. 8 and 9.

FIG. 8 is a schematic chart of the positional relation among the detected three markers 218a through 218c. In step S106, the PC 209 calculates the distance among the markers 218, that is, $d(P_1, P_2)$ and $d(P_2, P_3)$, using the coordinates calculated in step S105. FIG. 8 shows the two distances of $d(P_1, P_2)$ and $d(P_2, P_3)$.

Three markers 218 are attached to each of the surfaces A through D. These markers 218 are attached such that the positional relation among the markers 218 can be different for each surface, and also different depending on which is the upper surface, the surface E or the surface F. FIG. 9 shows an example of an arrangement pattern of the markers 218.

In FIG. 9, it is assumed that the surfaces E and F are squares each having a side of 105 cm, and each of the markers 218 has a horizontal length of 5 cm. In each of the surfaces A through D, the markers 218 are attached to both right and left ends, and another marker 218 is attached between them. Therefore, on each of the surfaces A through D, the distance between the two markers 218 attached to both ends is 100 cm. FIG. 9 shows the positions of the three markers 218 by the reference characters $P_1$, $P_2$, and $P_3$ in this order from the left of the image. The table shown in FIG. 9 shows, in order from the left, four columns of the nominal value of the predetermined $d(P_1, P_2)$, the nominal value of the predetermined $d(P_2, P_3)$, the surface to which the markers 218 detected in step S104, and the top surface.

Based on the above-mentioned assumption, the PC 209 determines, for example, if the value of the calculated $d(P_1, P_2)$ can be taken equal to 10 cm within a predetermined permissible error, and if the value of the calculated $d(P_2, P_3)$ can be taken equal to 90 cm within a predetermined permissible error, then the surface to which the three markers 218 detected in step S104 are attached is the surface A, and the surface E is a top surface.

Otherwise, it is not necessary to predetermine a permissible error. In this case, the PC 209 can determine, for example, if the value closest to the calculated value $d(P_1, P_2)$ in the leftmost column of the table shown in FIG. 9 is 10 cm, and the value closest to the calculated value $d(P_2, P_3)$ in the second column from the leftmost column of the table shown in FIG. 9 is 90 cm, then the surface to which the three markers 218 detected in step S104 are attached is the surface A, and the surface E is a top surface.

Thus, in comparing the values of the calculated distances among the markers 218 with the values of the predetermined distances among the markers 218, a process is performed with the error taken into account, but a practical processing method is optionally determined depending on modes of embodiments.

The table shown in FIG. 9 includes 8 rows excluding the header line because each of the four surfaces A through D has the case in which the surface E is a top surface, and the case in which the surface F is a top surface. The markers 218 are arranged such that in any two of the eight rows the combination of the values of the $d(P_1, P_2)$ and the $d(P_2, P_3)$ cannot be the same.

The predetermined arrangement pattern of the markers 218 such as shown in FIG. 9 is read to the RAM etc. of the PC 209 in advance. Therefore, the PC 209 determines the surface to which the detected three markers 218 are attached and the top surface based on the calculated values of $d(P_1, P_2)$ and $d(P_2, P_3)$ with reference to the arrangement pattern stored in advance. For example, in the example shown in FIG. 6, the PC 209 recognizes that the surface to which the three image-recognized markers 218 are attached is the surface A, the top surface is the surface E, and the three markers 218 are practically the markers 218a through 218c attached to the surface A.

The recognizing process is performed after the PC 209 has calculated the coordinates $^{a}p_1$, $^{a}p_2$, $^{a}p_3$ in the absolute coordinate system Σa of the positions $P_1$, $P_2$, $P_3$ of the markers 218a through 218c. Therefore, the PC 209 can calculate the position and direction of the operation table 203 represented by the absolute coordinate system Σa based on the coordinates $^{a}p_1$, $^{a}p_2$, and $^{a}p_3$. For example, the PC 209 calculates the position of the origin and the direction vectors of the axes of the operation table coordinate system on the absolute coordinate system Σa.

In the next step S107, the PC 209 calculates the matrix A as a transform parameter for transformation between the coordinate systems by using the position and direction of the operation table 203.

First, the PC 209 calculates the matrix B as a parameter for coordinate transformation from the absolute coordinate system Σa to the operation table coordinate system based on the calculation result in step S106.

On the other hand, since the workpiece 204 is fixed to a predetermined position on a predetermined surface of the table plate of the operation table 203, the matrix C as a parameter for coordinate transformation from the operation table coordinate system to the workpiece coordinate system Σw is statically determined in advance depending on the model of the workpiece 204, and does not change. The matrix C can be stored in advance on the hard disk drive of the PC 209, for example, or can be provided to the PC 209 from the host system 105 in step S107.

Therefore, by performing a matrix operation to calculate A=CB, the PC 209 can obtain the matrix A of the equation (3).

Alternatively, the PC 209 can also calculate the matrix A as follows. The coordinates in the operation table coordinate system of each of the markers 218 are predetermined. The coordinates of the markers 218 are read in advance to, for example, the RAM of the PC 209. The PC 209 can transform the read coordinates of the markers 218 into the coordinates in workpiece coordinate system Σw using the matrix C.

At this stage, the coordinates both in the absolute coordinate system Σa and in the workpiece coordinate system Σw of the positions $P_1$ through $P_3$ of the markers 218a through 218c have been calculated. Therefore, the PC 209 can calculate the matrix A based on the coordinates in coordinate systems Σa and Σw.

After the execution in step S107, control is passed to step S108. In step S108, the image processing board 214 detects the markers 217a and 217b of the driver 202 by image recognition processing for each of two images captured in step S103. That is, the coordinates in the right camera coordinate system and those in the left camera coordinate system of the markers 217a and 217b are detected.

In the next step S109, the PC 209 calculates the coordinates in the absolute coordinate system Σa of the markers 217a and 217b by the stereo vision algorithm. This is a similar process performed in step S105.

Figure 10:
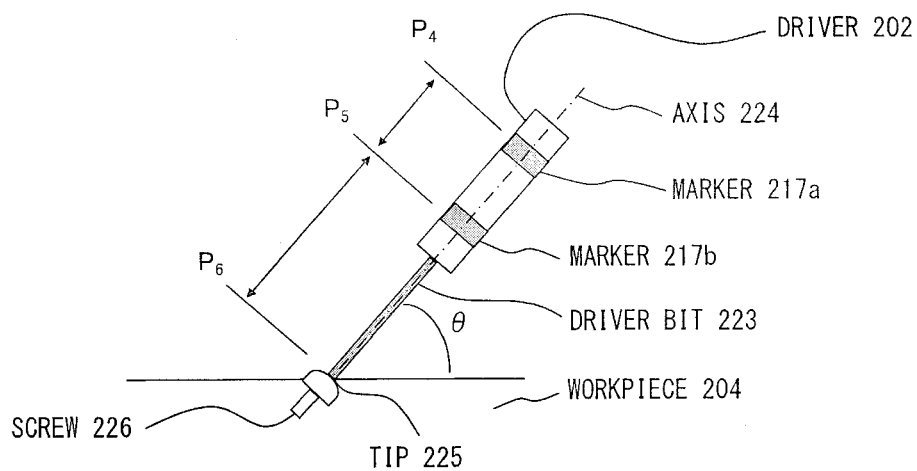
FIG. 10 is a schematic chart for explanation of the method of calculating the coordinates of the tip of the driver from the coordinates of markers.

In the next step S110, the PC 209 calculates the coordinates in the absolute coordinate system Σa of a tip 225 of the driver 202 using the coordinates of the markers 217a and 217b calculated in step S109. The calculating method is described below with reference to FIG. 10. FIG. 10 is a schematic chart represented in two-dimensional representation.

The two markers 217a and 217b are attached to the handle portion of the driver 202. For simple explanation, it is assumed that the two markers 217a and 217b are attached to the position that cannot be hidden behind the hands of the worker 201. The driver 202 has a handle portion and a driver bit 223 that form a substantially radial symmetry about an axis 224. The markers 217a and 217b are also respectively attached to form a radial symmetry about the axis 224. FIG. 10 shows the operation of tightening a screw 226 at a predetermined position of the workpiece 204, and the position of the tip 225 of the driver 202 when the screw 226 is completely tightened is the operation completion position of the operation.

In the process in step S109, the coordinates $^a p_4$ and $^a p_5$ in the absolute coordinate system Σa of the points $P_4$ and $P_5$ indicating the positions of the markers 217a and 217b are calculated. The point $P_4$ indicates the marker 217a, and the method of selecting the point $P_4$ is optionally determined depending on the mode for embodying the present invention.

For example, in the mode for embodying the present invention where the diameter of the handle portion of the driver 202 is sufficiently lower than the distance between the operation positions, there is no problem occurring when the thickness of the driver 202 is ignored. Otherwise, there is a mode for embodying the present invention in which the diameter of the driver 202 is lower than a predetermined permissible error depending on the accuracy of the coordinates in the absolute coordinate system Σa calculated based on the image captured by the CCD cameras 206 and 207. In the above-mentioned modes for embodying the present invention, when a straight line passing through a point at the center of the width of the marker 217a and corresponding to the axis 224 in the captured image is assumed, a point located on the straight line can be selected as a point $P_4$. A point $P_5$ indicating the position of the marker 217b is similarly selected. Thus, the coordinates of the tip 225 is calculated under an assumption that the tip 225 of the driver 202 falls on the straight line connecting the point $P_4$ to the point $P_5$.

In another mode for embodying the present invention, for example, an intersection point of the plane perpendicular to the axis 224 passing through the center of the width of the marker 217a and the axis 224 can be selected as a point $P_4$. In this case, since the point $P_4$ is not on the outer surface of the marker 217a, the PC 209 can calculate the coordinates of the point $P_4$ from the coordinates of a plurality of points on the outer surface of the marker 217a calculated based on the stereo vision principle, and the known diameter of the handle portion of the driver 202.

In the following descriptions, it is assumed that the straight line connecting the point $P_4$ indicating the marker 217a and the point $P_5$ indicating the marker 217b can be regarded as the axis 224. Based on the assumption, the point $P_6$ of the tip 225 of the driver 202 is located on the axis 224.

In the absolute coordinate system Σa, the equation indicating the straight line of the axis 224 can be obtained based on the coordinates $^a p_4$ and $^a p_5$. The angle θ shown in FIG. 10 is an angle made by the workpiece 204 and the axis 224 and represented in a two-dimensional schematic chart.

On the other hand, the attachment position of the markers 217a and 217b on the driver 202 is known as described above. The length of the driver bit 223 is predetermined or measured in advance. Therefore, it is possible to calculate the distance $d(P_5, P_6)$ between the point $P_5$ and the point $P_6$ from the known static data only.

The PC 209 calculates the coordinates of the position of the distance $d(P_5, P_6)$ from the point $P_5$ in the opposite direction of the point $P_4$ as viewed from the point $P_5$ on the straight line of the axis 224 in step S110. The PC 209 then determines the calculated coordinates as the coordinates of the point $P_6$ in step S110.

Which is the marker 217a (or 217b) between the two image-recognized markers can be determined in various methods, and the coordinates of the point $P_6$ are calculated based on the determination.

For example, in a mode for embodying the present invention, the operation of tightening the screw 226 with the driver 202 set perpendicularly is limited to the case in which the screw 226 is placed and the driver 202 tightens the screw from above. Therefore, when the tilt of the straight line of the axis 224 is nearly perpendicular, a higher marker of the two position-detected markers is recognized as the marker 217a, and a lower marker is recognized as the marker 217b.

There is also a mode for embodying the present invention in which the position of the worker 201 is limited to a predetermined range, for example, it is predetermined that the worker 201 is positioned constantly to the left of the workpiece 204 as viewed from the CCD cameras 206 and 207. In this case, in the two position-detected markers, the left marker as viewed from the CCD cameras 206 and 207 can be recognized as the marker 217a, and the right marker can be recognized as the marker 217b.

Otherwise, the feature in geometry that the driver 202 has a thick handle portion and the thin driver bit 223 can be taken into account. It is also possible to recognize a marker farther from the driver bit 223 as the marker 217a in the two coordinates-detected markers, and a closer marker as the marker 217b.

In any case, the PC 209 calculates the coordinates $^a p_6$ in the absolute coordinate system $\Sigma a$ of the point $P_6$ indicating the tip 225 of the driver 202 based on the coordinates of the points $P_4$ and $P_5$ indicating the markers 217a and 217b. The coordinates $^a p_5$ are practical example of the operation completion coordinates described with reference to FIG. 1.

Then, the PC 209 coordinate-transforms in step S111 the coordinates $^a p_6$ using the parameter calculated in step S107, that is, the matrix A, and calculates the coordinates $^w p_6$ in the workpiece coordinate system $\Sigma w$ of the point $P_6$.

Afterwards, in step S112, the PC 209 compares the design data of the screwing position read in step S101 as operation coordinates with the coordinates $^w p_6$ of the tip 225 of the driver 202 calculated in step S111, and locates (namely, identifies) to which screwing position the just completed operation corresponds. The coordinate system used in the process in step S112 is the workpiece coordinate system $\Sigma w$ only.

For example, from the coordinates $^w p_6$ and N operation coordinates, the PC 209 calculates the distance between the point $P_6$ and each of the N operation positions, thereby N values of distances being obtained. Then, the PC 209 locates the operation position indicating the shortest distance from the point $P_6$ as the operation position of the just completed screwing operation. Alternatively, the coordinates $^w p_6$ are not compared with all of the N triplets of operation coordinates, but a triplet of the operation coordinates of the completed operation can be deleted from the comparison targets.

In the next step S113, the PC 209 determines whether or not the location in step S112 has succeeded. If it has succeeded, control is passed to step S114, and the PC 209 controls the operation monitor 212 to display the location result. If it has failed, control is passed to step S115, and the PC 209 controls the operation monitor 212 to display that the location has failed.

The criterion in step S113 depends on the mode for embodying the present invention. For example, assume a case in which any of the N operation positions that indicates the shortest distance to the tip 225 of the driver 202 in the N operation positions is selected in step S112. In this case, only if the shortest distance is equal to or lower than a predetermined threshold, then it is determined in step S113 that the location has succeeded. Otherwise, it can be determined that the location has failed.

Although not shown in FIG. 7, there can be the case in which image recognition fails in step S104 or S108. In this case, since the operation position cannot be located accordingly, it is determined "No" in step S113.

After performing step S114 or S115, control is passed to step S116. In step S116, the PC 209 determines whether or not all of the N operations to be performed in the operation cell 103 have been completed. If all of them have been completed, it determines "Yes", and the process shown in FIG. 7 terminates. If there still remains any operation to be performed, the PC 209 determines "No", and control is returned to step S102. When the process shown in FIG. 7 is completed, the workpiece 204 is transmitted to the next operation cell 104.

Figure 11:
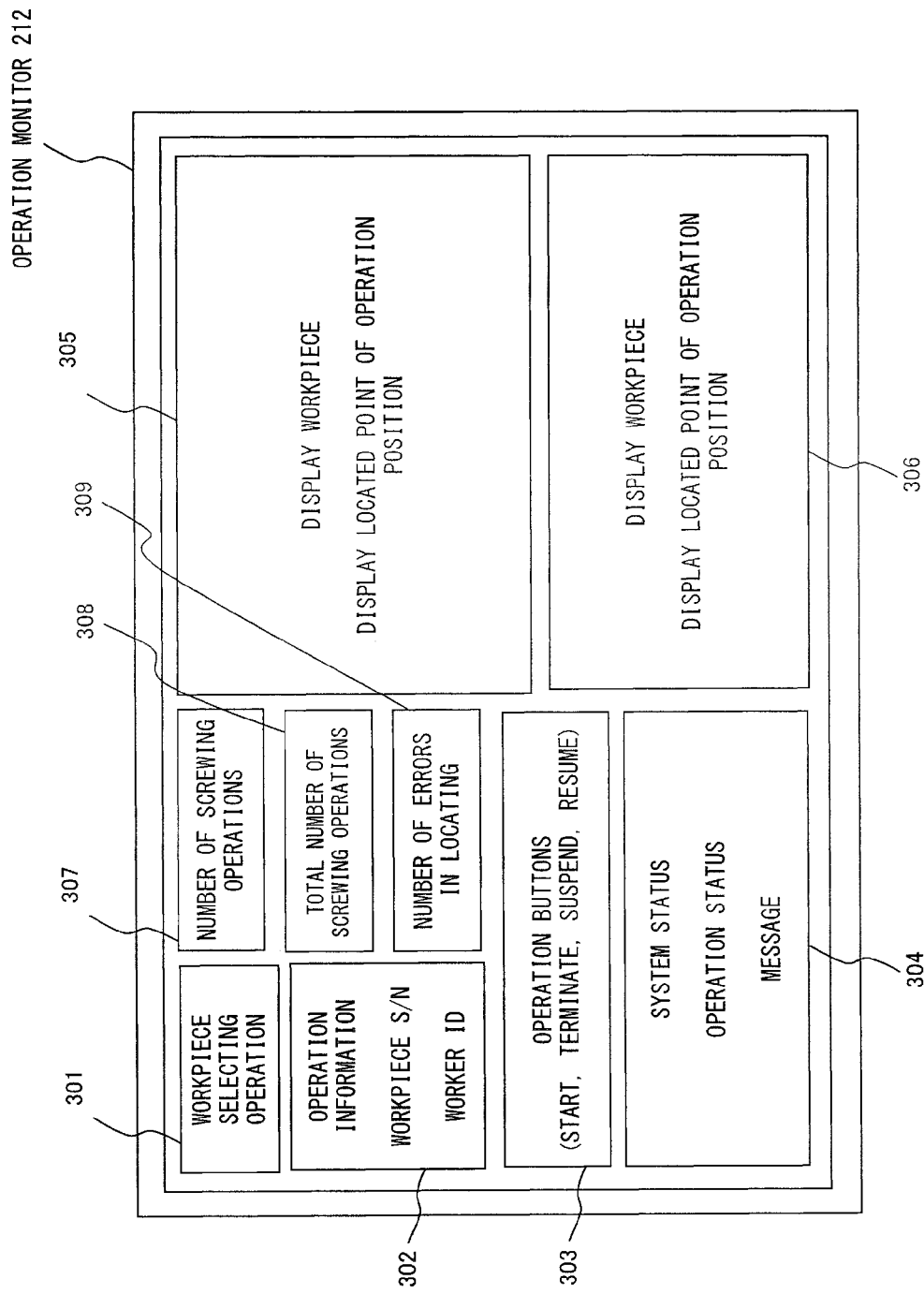
FIG. 11 shows an example of a display screen of an operation monitor.

FIG. 11 shows an example of the display screen of the operation monitor 212. In the example shown in FIG. 11, nine areas are provided on the screen of the operation monitor 212, and the nine types of information are displayed by a character, symbol, picture, etc. in the corresponding areas.

A workpiece selecting operation display area 301 is an area for selection and display of a model of the workpiece 204 being assembled. In a mode for embodying the present invention, the worker 201 selects a model of the workpiece 204 from among the options displayed on the workpiece selecting operation display area 301 and indicates the selection result on the PC 209 through the external device 213, and the selection result is displayed on the workpiece selecting operation display area 301. In another mode for embodying the present invention, the result of the worker 201 allowing the bar code reader 211 to read the bar code indicating the model of the workpiece 204 is displayed on the workpiece selecting operation display area 301. Therefore, the worker 201 only has to confirm the displayed model.

An operation information display area 302 displays the S/N of the workpiece 204 and the ID of the worker 201. A message for prompting the worker 201 to input his or her ID using the bar code reader 211 can also be displayed.

An operation button display area 303 includes "start", "terminate", "suspend", and "resume" buttons displayed. The worker 201 depresses the "start" button when a series of operations for the workpiece 204 is started using, for example, a mouse, depresses the "terminate" button when a series of operations for the workpiece 204 is forcibly terminated for any reason, depresses the "suspend" button when a series of operations is to be suspended for a break etc., and depresses the "resume" button when a series of suspended operations is resumed.

A detail display area 304 includes detailed information such as the status of the entire system, the progress of N operations to be performed in the operation cell 103, various messages including the instructions for the operation to be performed next, etc.

The workpiece 204 selected in the workpiece selecting operation display area 301 is graphically displayed in a workpiece face display area 305 and a workpiece reverse display area 306. In the example shown in FIG. 11, it is assumed that an operation for both surfaces of face and reverse sides of the workpiece 204 is required. Therefore, the workpiece face display area 305 displays the face of the workpiece 204, and the workpiece reverse display area 306 shows the reverse of the workpiece 204. The operation-completed portions and the portions to be operation-performed are graphically displayed. For example, the operation-completed portions and the portions to be operation-performed are respectively marked with black and white circles. The operation-completed portions refer to the portions in which the location of an operation position has been successfully performed.

A screwing count display area 307 includes the number of times M indicating the frequency of the determination "Yes" in step S113 shown in FIG. 7, namely, the number of times M indicating the frequency of the successful locating of the operation position. Or, the value (N–M) obtained by subtracting the number of times M from the total number N of the operations to be performed can be displayed in the screwing count display area 307.

A total screwing number display area 308 includes the total number N of the operations to be performed in the operation cell 103 on the workpiece 204.

A locating error count display area 309 includes the number of "No" in step S113 shown in FIG. 7, that is, the number of times of unsuccessful operations of locating an operation position for any reason.

Figure 12:
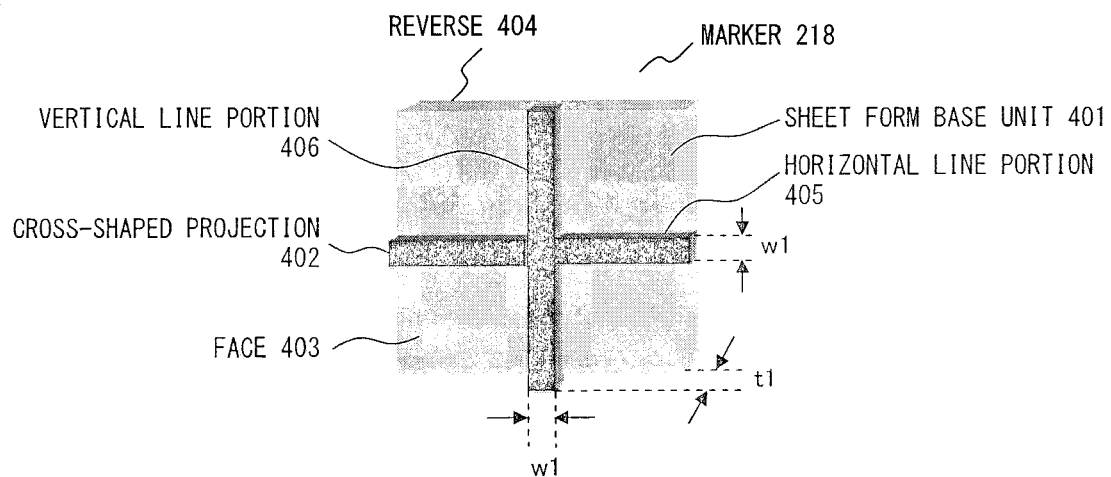
FIG. 12 shows an example of a marker to be attached to an operation table.

FIG. 12 shows an example of the marker 218 attached to the operation table 203. The marker 218 is provided with a sheet form base unit 401 and a cross-shaped projection 402.

In the example shown in FIG. 12, the geometry of the sheet form base unit 401 is the form of a rectangular sheet. A reverse 404 of the sheet form base unit 401 is an attachment surface to the operation table 203. For example, an adhesive is applied to the reverse 404, and the marker 218 is attached to the operation table 203. The cross-shaped projection 402 is extended in the thickness direction of the sheet form base unit 401 from the face 403 of the sheet form base unit 401. The cross-shaped projection 402 includes a horizontal line portion 405 and a vertical line portion 406 orthogonal to each other and having the width of w1 and the thickness of t1. The sheet form base unit 401 is made of a high reflectance material such as a retroreflective material etc. for causing retroreflection indicating the reflection of light in the direction of incident light. The cross-shaped projection 402 is made of a low reflection material having a low reflectance of incident light.

With the configuration of the markers 218, the accuracy of detection of the markers 218 by image recognition performed by the image processing board 214 on the images captured by the CCD cameras 206 and 207 can be enhanced for the following first through third reasons.

First, since the sheet form base unit 401 is made of a retroreflective material, the reflectance is substantially constant regardless of the capture angle of the CCD cameras 206 and 207, and is high. On the other hand, the cross-shaped projection 402 is made of a low reflectance material. Therefore, regardless of the capture angle, a high contrast cross-shaped image is taken in the captured image, and the outline of the image is clear. Thus, the recognition accuracy for recognizing the markers 218 can be enhanced when the markers 218 are recognized by image recognition using a technique such as the well-known edge extracting method.

Second, since there are few high contrast cross-shaped objects in an operation cell in many cases, the markers 218 are not mixed with the background of the image, and therefore can be easily detected. The images captured by the CCD cameras 206 and 207 include various objects in the operation cell and the worker 201. Many of them have circular or rectangular outlines. Therefore, it is empirically informed that the recognition rate of markers is degraded by using markers with circular patterns, rectangular patterns, or the like. On the other hand, the recognition rate of the marker 218 shown in FIG. 12 is hardly degraded in undesired conditions such as various objects included in the background.

Third, by appropriately determining the width w1 and the thickness t1 of the cross-shaped projection 402, it is possible to reduce the change in the width of the horizontal line and the vertical line of the cross shape in an image regardless of the angle of capturing the marker 218.

When the marker 218 is captured from the front, what is captured in the image is substantially only the front side of the cross-shaped projection 402, and most of the side surfaces of the horizontal line portion 405 and the vertical line portion 406 are not captured. Therefore, in this case, the width of the horizontal line in the image is determined by the distance between the CCD camera 206 or 207 and the marker 218 and the width w1 of the horizontal line portion 405. The same holds true with the width of the vertical line in the image.

On the other hand, when the marker 218 is captured diagonally from the left or right of them, both of a front surface and a side surface of the vertical line portion 406 are captured in the image. At a capture angle at which the width of the front surface in the image is the narrower, the width of the side surface in the image is the broader. Therefore, if the width w1 and the thickness t1 of the cross-shaped projection 402 are appropriate, the width of the vertical line of the cross shape in the image does not largely change depending on the capture angle. For a similar reason, when the marker 218 is captured from diagonally above or below them, the width of the horizontal line of the cross shape in the image does not largely change depending on the capture angle.

When the change of the width of the vertical line and the horizontal line of the cross shape is small in the image, the cross shape corresponding to the marker 218 in the image can be easily recognized, and the accuracy of the image recognition can be naturally enhanced. Since the appropriate width w1 and thickness t1 depend on various elements such as the size of an operation cell, the mounting angle of the CCD cameras 206 and 207, the size of the markers 218, etc., it is desired to appropriately determine them after experiments etc.

FIGS. 13A and 13B show examples of parts to be attached to the driver 202 for use as the marker 217. In FIGS. 6 and 10, two markers 217a and 217b are shown without limiting a practical geometry or material, but they do not refer to two different objects required. It is obvious that one marker 217 as an object, which has two position recognizable portions, also can be used. FIGS. 13A and 13B show examples of the marker 217.

The marker 217 shown in FIG. 13A is attached to the handle portion of the driver 202. It is desired that the marker 217 is attached to the position in which it is not hidden by the hands of the worker 201. The marker 217 includes the cylindrical base unit 408 and three cylindrical projections 409a, 409b, and 409c. The cylindrical base unit 408 is made of a high reflectance material as with the sheet form base unit 401. The cylindrical projections 409a, 409b, and 409c are made of a low reflectance material as with the cross-shaped projection 402.

Each of the cylindrical projections 409a, 409b, and 409c is mounted along the perimeter outside the side surface of the cylinder of the cylindrical base unit 408. That is, the cylindrical base unit 408 and the cylindrical projections 409a, 409b, and 409c are configured to form a radial symmetry on a common axis 410, and the entire marker 217 forms the radial symmetry on the axis 410. The length in the direction of the axis 410 is called as a "width" in the description on FIG. 13A. In the example shown in FIG. 13A, the widths of the cylindrical projections 409a, 409b, and 409c are w2. The length in the radial direction, that is, the distance from the axis 410 is called a "thickness" in the description on FIG. 13A. The cylindrical projections 409a, 409b, and 409c are extended outside by the thickness of t2 from the cylindrical base unit 408.

The marker 217 shown in FIG. 13A is attached to the driver 202 such that the axis 410 of the marker 217 and the axis 224 of the driver 202 can match each other. For example, the cylindrical base unit 408 is hollow and is formed such that its inner diameter is substantially equal to the outer diameter of the handle portion of the driver 202. In this case, by engaging all or a part of the handle portion of the driver 202 in the space inside the cylindrical base unit 408, the marker 217 can be attached to the driver 202 such that the axis 410 can match the axis 224. Otherwise, the cylindrical base unit 408 that is not hollow but solid is acceptable. In this case, for example, the marker 217 can be attached to the driver 202 by attaching the cylindrical projection 409c to the end of the handle portion of the driver 202. In addition, a part such as a pawl for attachment to the driver 202 can be provided for the marker 217.

FIGS. 6 and 10 show the driver 202 with two markers 217a and 217b because at least two objects whose coordinates are to be detected are required. To reduce detection error, it is obvious that three or more objects whose coordinates are to be detected can be used. Therefore, FIG. 13A shows the marker 217 provided with three cylindrical projections 409a, 409b, and 409c whose coordinates are to be detected.

With the marker 217 configured as described above, the accuracy of the image recognition of the marker of the driver by the PC 209 on the image captured by the CCD cameras 206 and 207 can be enhanced for the following reasons.

First, since the cylindrical base unit 408 is made of a retroreflective material, the contrast between the cylindrical base unit 408 and the cylindrical projections 409a, 409b, and 409c in the captured image is constantly high regardless of the capture angle. Therefore, regardless of the capture angle, the cylindrical projections 409a, 409b, and 409c can be easily detected by image recognition.

Second, since the marker 217 takes the form of a radial symmetry, the geometry of the marker 217 in the captured image does not greatly change even if a slope of a line passing through the marker 217 and the CCD camera 206 (or CCD camera 207) largely changes on the horizontal plane parallel to the floor. The feature contributes to the improvement in recognition rate.

Third, since the cylindrical projections 409a, 409b, and 409c have the thickness of t2, and are extended outside the cylindrical base unit 408, the cylindrical projections 409a, 409b, and 409c having a certain degree of size are captured in the image even if the angle made by the optical axis of the CCD camera 206 or 207 and the axis 410 of the marker 217 is small. The third reason is similar to the third reason relating to the marker 218 shown in FIG. 12. Therefore, by appropriately determining the width w2 and the thickness t2 depending on the mode for embodying the present invention, the range in which the marker 217 can be detected by the image recognition can be expanded, thereby enhancing the recognition rate.

The marker 217 shown in FIG. 13B has almost the same configuration as the marker 217 shown in FIG. 13A. Only the difference is that the marker 217 shown in FIG. 13B is further provided with a cylindrical projection 409d.

As exemplified in FIGS. 13A and 13B, a marker can be provided to be preferably used in the operation position locating system. The marker is attachable to a device such as the driver 202, and comprises a base unit and a plurality of projections extending from the base unit. The base unit has high reflectance and the plurality of projections have low reflectance, or the base unit has low reflectance and the plurality of projections have high reflectance. Each of the plurality of projections takes a form of a substantially radial symmetry about an axis common among the plurality of projections when the marker is attached to the device.

Since the projections of the marker take the form of substantially radial symmetry, the position of the marker can be detected with constant reliability when the tool such as the driver 202 is observed from any direction by attaching the marker to the tool for use in the manufacturing process. Using the above-mentioned marker, the detection accuracy of the operation completion coordinates detection unit can be improved.

Described above in detail are the modes for embodying the present invention. The summary of the effect obtained by above-described embodiments relating to the operation cells 101 through 104 in the workpiece assembly line 100 is described below.

First, the operations to be performed can be divided into those actually performed and those not performed yet. Therefore, it is possible, for example, for the PC 209 or the host system 105 to automatically check whether or not there is any missed operation not performed in the manufacturing process. By the worker 201 performing the operation based on the check result, the workpiece 204 in the state in which there is an operation to have been performed, but has not been performed yet can be prevented from being erroneously transmitted to the next process.

Therefore, it is possible to reduce the number of man-hours for an operation instruction to be provided for the worker 201 who has failed to perform an operation. Furthermore, the number of man-hours in testing process steps to be performed after the manufacturing process can also be largely reduced. Conventionally, it has been necessary that an inspector visually sees an appearance of the workpiece 204 to search for any portion of missing an operation, and to check the location of the missed operation. However, according to the above embodiments, it is not necessary to perform the inspection, or it is possible to largely reduce the inspection steps.

In addition, according to the above embodiments, the number of occurrences of defective products due to forgetting an operation can be reduced, thereby enhancing the yield of products.

In addition to the above-mentioned common effects, the modes for embodying the present invention described above in detail have the following effect.

First, without using a marker requiring electric power, and using the movable operation table 203, an operation position can be located. Therefore, the operation position locating system according to the above-mentioned modes for embodying the present invention can be applied to a larger number of manufacturing processes.

Furthermore, since the operation position locating system is provided with the function of providing guidance for the worker 201, and various pieces of information shown in FIG. 11 are displayed on the operation monitor 212, the worker 201 can perform an operation while checking the operation monitor 212, and can be prevented from forgetting tightening a screw. Furthermore, even if the worker 201 carelessly forgets to tighten the screw, it is displayed on the operation monitor 212, the worker 201 recognizes the failure, and then the worker 201 performs the operation correctly.

Since the driver 202 is an electrically driven torque driver, the torque applied to a screw and the driving time can be detected. Therefore, scoring (or galling) of a screw is detectable, and only placing a screw and forgetting tightening it can also be detected.

For example, when a torque is correctly applied in the direction of the screw hole, the time taken from starting tightening a screw to reaching a specified torque is expected to be equal to the time taken from starting tightening the screw to correctly setting the screw. Therefore, when the difference between the time values is large, it is detectable that scoring the screw has occurred because the torque has been applied to the screw inclined against the screw hole. When the scoring of a screw is detected, it is desired that the driver 202 issues a signal as a notification of a defective operation instead of issuing a completion signal. According to the signal, the PC 209 controls the operation monitor 212 to display a warning in the detail display area 304 etc., thereby allowing the worker 201 to perform an appropriate operation.

If a screw is forgotten after being placed in its position, the completion signal corresponding to the screwing operation is not output from the driver 202. Therefore, the operation position locating system recognizes that the operation has not been performed. Accordingly, the operation position of the operation is displayed as a portion for which an operation is to be performed in the workpiece face display area 305 or the workpiece reverse display area 306, thereby allowing the worker 201 to recognize that he/she forgot to tighten the screw.

The present invention is not limited to the above-mentioned modes for embodying the present invention, but variations can be applied. Described below are examples of the variations.

In the above-mentioned modes for embodying the present invention, an operation completion position is compared with an operation position by representing them by coordinates in workpiece coordinate system Σw in order to locate the operation position corresponding to the operation completion position. On the other hand, they can be compared by representing them by the coordinates in the absolute coordinate system Σa. In this case, in step S107 shown in FIG. 7, the matrix A is replaced with a matrix $A^{-1}$ in calculation. The matrix $A^{-1}$ is an inverse matrix of the matrix A, and a transformation matrix from the workpiece coordinate system Σw to the absolute coordinate system Σa. In this case, the process in step S111 is unnecessary, and a process of transforming the operation coordinates into the coordinates in the absolute coordinate system Σa in step S112 is required.

Although it is possible to adopt the above-mentioned variation, it is not so preferable. That is, the method of transforming the coordinates in the absolute coordinate system Σa into those in the workpiece coordinate system Σw as shown in FIG. 7 requires less computational complexity and is therefore efficient.

In FIG. 7, only one set of coordinates representing one point is transformed from the absolute coordinate system Σa to the workpiece coordinate system Σw in step S111. On the other hand, if the number of operations to be performed in the operation cell 103 is N, it is necessary to transform N sets of operation coordinates from the workpiece coordinate system Σw into the absolute coordinate system Σa in the variation example described above. In this case, the larger the value of N is, the higher the computational complexity is. In some modes for embodying the present invention, the already-located operation position can be removed from a comparison target with the operation completion position. Nevertheless, the variation example requires higher computational complexity than the case shown in FIG. 7.

Since the operation table 203 is movable, it is necessary to transform the coordinates in one coordinate system to another coordinate system each time an operation is completed. Therefore, the method of first performing a coordinate transformation, storing the transformation result, and then referring to the stored transformation result cannot be used. From this viewpoint, it is clear that the computational complexity shown in FIG. 7 is lower than the variation example.

The geometry and the material of the markers 217 and 218 are not limited to the exemplified ones. For example, the marker 218 shown in FIG. 12 shows the geometry in which one horizontal line portion 405 is orthogonal to one vertical line portion 406, but two or more horizontal line portions 405 or vertical line portions 406 can be applied. It is not necessary to have the geometry of straight lines orthogonal to each other, but any geometry such as a polygon, circle, oval, etc. can be applied as the marker 218.

For example, a spherical marker with a hole to insert the handle portion of the driver 202 therein can be used instead of the radially symmetric marker 217. The spherical marker improves a recognition rate in image recognition because a shape of the spherical marker in the captured image is constantly a circle, regardless of the capture angle of the CCD cameras 206 and 207.

For example, a predetermined pattern may be formed on a surface of the spherical marker and the pattern may be made by a retroreflective material and a low reflectance material. The pattern enables the PC 209 to calculate a position and a direction of the driver 202 with the spherical marker so that the PC 209 can calculate the coordinates $^{a}p_{6}$ of the point $P_{6}$ indicating the tip 225 of the driver 202.

In the example above, three markers 218 are attached to each of the surfaces A through D of the operation table 203, but it is obviously possible to use one marker formed such that three cross-shaped projections 402 are extended from the face 403 of one elongated sheet form base unit 401, and it is clear that such formed marker have the same effects as the marker 218 shown in FIG. 12. In this case, the three cross-shaped projections 402 are arranged on the face 403 of the elongated sheet form base unit 401 at the interval as illustrated in FIG. 8, for example.

The markers 217 and 218 can be made of different materials having greatly different reflectances so that they can be easily detected in the image recognition. Therefore, the marker 218 can have a low reflectance sheet form base unit 401 and a high reflectance cross-shaped projection 402. Similarly, the marker 217 can have a low reflectance cylindrical base unit 408 and high reflectance cylindrical projections 409a through 409d.

The markers 217 and 218 shown in FIGS. 12 through 13B have the merits that they do not require electric power, and can be attached to an existing driver 202 and operation table 203 without changing them. However, some modes for embodying the present invention allow a high-brightness light emission element such as an LED (light emitting diode) etc. or an ultrasonic generator to be used as the markers 217 and/or 218. That is, since it is only necessary to detect the position in the three-dimensional space, the mode for embodying the present invention shown in FIG. 4 can be changed to use a sensor such as an ultrasonic sensor, a vibration sensor, etc. for use in a three-dimensional measure.

For example, when an LED is used for the markers 217 and/or 218, the markers can be recognized with high accuracy by using the CCD cameras 206 and 207 of the wavelength sensitivity for the wavelength of the light emitted by the LED. When an ultrasonic generator is used as the markers 217 and/or 218, an ultrasonic signal is received by a plurality of ultrasonic receivers whose positional relations are mutually known and which replace the CCD cameras 206 and 207, thereby detecting the positions of the markers from the difference in propagation time of the ultrasonic signal.

When an LED or an ultrasonic generator is used as the marker 217, the completion signal generation tool 110 and the marker 217 can be combined as one device. For example, when the torque applied to a screw by the driver 202 reaches a specified torque, the ultrasonic generator attached to the driver 202 generates an ultrasonic signal as a completion signal, a plurality of ultrasonic receivers receive the ultrasonic signal, and the PC 209 can calculate the position of the ultrasonic generator.

However, when the LED and/or the ultrasonic generator are used, there arise the problem that the driving power such as electric power etc. is consumed and the problem that a battery or wiring is necessary for supply of the driving power. It may be difficult to newly provide the wiring for the existing driver 202 or operation table 203. It may also be difficult to provide the wiring without twisting or cutting the wiring also without varying the movable area of the operation table 203.

In the above-mentioned modes for embodying the present invention, two CCD cameras 206 and 207 are used, but three or more CCD cameras can be used to eliminate a blind spot etc.

The CCD cameras 206 and 207 can capture a luminance image, that is, a monochrome gray-scale image, or a color image.

In the former case, there are the merits that a smaller amount of data is required for image processing, no adjustment to a color filter is required, etc. Furthermore, since the markers 217 and 218 shown in FIGS. 12 through 13B are made of a high reflectance material and a low reflectance material, they can be easily recognized in a luminance image.

On the other hand, when the CCD cameras 206 and 207 for capturing a color image are used, for example, the markers 218 having red cross-shaped projections 402 can be attached to the surface A, and the markers 218 having blue cross-shaped projections 402 can be attached to the surface C. Thus, a color difference can be used in determining the direction of the operation table 203. Thus, it is also possible to moderate the restrictions on the attachment position of the markers 218 on the surfaces A through D as shown in FIG. 9. That is, the practical configuration and arrangement of the markers 218 are optionally determined only if the surfaces of the operation table 203 can be discriminated from the appearance including the shape, color, arrangement pattern, etc. of the markers 218.

The contents of the operation in the above-mentioned modes for embodying the present invention relate to a screwing operation. However, other modes of embodiments can be directed to other type of operations. For example, some modes of embodiments can be directed to a manufacturing process including the operations of soldering, welding, seizing, caulking, swaging, spot welding, bonding, etc. In addition, some embodiments can be applied to the case where one process includes plural types of operations such as screwing, soldering, etc.

For example, in the process of ultrasonic welding for bonding resin plates at plural points, an ultrasonic welding unit issues a completion signal each time a welding operation is completed at each welding point, and the PC 209 receives the completion signal through the IO board 215. Thus, if a tool configured to issue a completion signal when an operation is completed is used, the above-described embodiments can be modified to be applied to operations other than a screwing operation.

Some other embodiments can be applied to a process other than an assembly process. For example, an inspecting process etc. other than the assembly process can be included in the manufacturing process. In the inspecting process, an inspection can be made using a tool. If a configuration is designed such that an inspecting tool can issue a completion signal each time one inspecting operation is completed, then an embodiment can be applied to the inspecting process.

The tool itself can be hand-powered, not requiring electric power. For example, if the completion of an operation can be detected by a vibration sensor, the vibration sensor is available in an embodiment so that the vibration sensor is attached to the hand-powered tool and issues a completion signal.

The operation table 203 shown in FIG. 4 is designed for enabling position movement, rotation of a table plate on the horizontal axis, and rotation of a table plate on the vertical axis. However, it is obvious that an operation table of another type can also be used such as an operation table whose table plate is designed not to rotate on the horizontal axis. In this case, the reduction of the freedom in the movement of the operation table enables the moderation of the restrictions in the arrangement pattern of the markers 218.

Although the operation position of a screwing operation is a point, but there is an operation to cover a range as a linear or planar extension. For example, when metal plates are processed by fillet weld, the welding is linearly performed. Thus, some embodiments can be applied to an operation performed on a range having a linear or planar expansion.

In an operation performed on a range having a linear or planar expansion, for example, a tool configured to intermittently issue a signal at predetermined intervals during the operation is used. The signal is called an "operation in-progress signal". Like the completion signal, an operation in-progress signal is received by the PC 209 through the driver controller 210 and the IO board 215. The position in which an operation is performed when the PC 209 receives the operation in-progress signal is called an "operation in-progress position".

The operation position is represented as a set of coordinates in the workpiece coordinate system $\Sigma w$ of the positions of points existing and extending linearly or as a plane, or represented by an equation expressing a line or a plane in the workpiece coordinate system $\Sigma w$. Upon receipt of the operation in-progress signal, the PC 209 performs a process similar to one performed when the completion signal is received. That is, the PC 209 detects the position and direction of the operation table 203 when receiving an operation in-progress signal, calculates a parameter for transformation from the absolute coordinate system La to the workpiece coordinate system $\Sigma w$, detects the coordinates of an operation in-progress position in the absolute coordinate system $\Sigma a$, transforms the detected coordinates of the operation in-progress position in the absolute coordinate system $\Sigma a$ into the workpiece coordinate system $\Sigma w$, compares the transform result with the operation coordinates stored in advance, and locates the operation position corresponding to the operation in-progress position.

In this case, an operation performed linearly or on a plane corresponds to a locus of points including one or more operation in-progress positions with which respective points of the operation position have been located and one operation completion position. Some embodiments are thus applied to the operation performed linearly or on a plane. The timing of issuing an operation in-progress signal is optionally determined.

In the above-mentioned mode for embodying the present invention, both absolute coordinate system $\Sigma a$ and workpiece coordinate system $\Sigma w$ are orthogonal coordinate systems, but it is obvious that other coordinate systems such as a polar coordinate system etc. can be used.

In the example shown in FIG. 11, there are two areas graphically representing the workpiece 204. On the other hand, there is the workpiece 204 only requiring an operation on one surface, and the workpiece 204 requiring an operation on three or more surfaces. It is preferable to appropriately adjust the number of display areas depending on the number of surfaces to be processed. When there are a plurality of operations to be performed in one process, and the operations are to be performed in a predetermined order, it is preferable that the operation monitor 212 displays the instruction to indicate the order of the operations.

What is claimed is:

1. An operation position locating system which confirms a position where a part is attached to a product in a manufacturing process in which the part is attached to the product using a tool, the operation position locating system comprising:
   a completion signal output unit configured to output a signal which is caused by the tool and which indicates completion of attaching the part to the product; and
   a processor configured
      to capture, from a plurality of cameras each configured to take an image of a range including the product and the tool, a plurality of images of the range upon receipt of the signal,
      to detect a three-dimensional position and a three-dimensional direction of an operation table and a three-dimensional position and a three-dimensional direction of the tool via image recognition using the plurality of captured images, wherein the operation table includes a leg portion which enables the operation table to move on a floor as desired by an operator and a table plate which is rotatable as desired by the operator with respect to at least one axis, and the product is fixed to a determined position on the operation table to keep a predetermined positional relation between the operation table and the product,
      to calculate a three-dimensional position and a three-dimensional direction of the product from the three-dimensional position of the operation table, the three-dimensional direction of the operation table, and the predetermined positional relation,
      to calculate a three-dimensional position of the part from the three-dimensional position and the three-dimensional direction of the tool,
      to search design data in which three-dimensional coordinates of each of a plurality of three-dimensional positions to which a plurality of parts are to be attached are included and represented according to a three-dimensional coordinate system based on the product, for a three-dimensional position that is one of the plurality of three-dimensional positions and that matches the calculated three-dimensional position of the part, and
      to identify which of the plurality of three-dimensional positions the part has been attached to by the tool, according to a result of the search of the design data.

2. The operation position locating system according to claim 1, wherein:
   the processor is configured
      to detect the three dimensional position and direction of the tool by detecting a plurality of markers on the tool via image recognition using the plurality of captured images, and
      to detect the three dimensional position and direction of the operation table by detecting a plurality of markers on the operation table via image recognition using the plurality of captured images.

3. The operation position locating system according to claim 1, wherein:
   the tool is a power-driven torque driver; and
   the signal is a torque-up signal of the power-driven torque driver.

4. The operation position locating system according to claim 1, wherein
   using the calculated three-dimensional position of the part and the calculated three-dimensional position and direction of the product, the processor locates a relative position of the part with respect to the product, and
   the processor uses the relative position in searching the design data.

5. A manufacturing method of a product, the manufacturing method comprising:
   receiving, by a processor, a signal which is caused by a tool used by an operator for attaching a part to the product and which indicates completion of attaching the part to the product;
   capturing, by the processor and from a plurality of cameras each configured to take an image of a range including the product and the tool, a plurality of images of the range upon receipt of the signal;
   detecting, by the processor, a three-dimensional position and a three-dimensional direction of an operation table and a three-dimensional position and a three-dimensional direction of the tool via image recognition using the plurality of captured images, wherein the operation table includes a leg portion which enables the operation table to move on a floor as desired by the operator and a table plate which is rotatable as desired by the operator with respect to at least one axis, and the product is fixed to a determined position on the operation table to keep a predetermined positional relation between the operation table and the product;
   calculating, by the processor, a three-dimensional position and a three-dimensional direction of the product from the three-dimensional position of the operation table, the three-dimensional direction of the operation table, and the predetermined positional relation;
   calculating, by the processor, a three-dimensional position of the part from the three-dimensional position and the three-dimensional direction of the tool;
   searching, by the processor, design data in which three-dimensional coordinates of each of a plurality of three-dimensional positions to which a plurality of parts are to be attached are included and represented according to a three-dimensional coordinate system based on the product, for a three-dimensional position that is one of the plurality of three-dimensional positions and that matches the calculated three-dimensional position of the part; and
   identifying, by the processor, which of the plurality of three-dimensional positions the part has been attached to by the tool, according to a result of the searching the design data.

6. The manufacturing method according to claim 5, wherein:
   the three dimensional position and direction of the tool are detected by detecting a plurality of markers on the tool via image recognition using the plurality of captured images; and
   the three-dimensional position and direction of the operation table are detected by detecting a plurality of markers on the operation table via image recognition using the plurality of captured images.

7. The manufacturing method according to claim 5, wherein
   the tool is a power-driven torque driver, and
   the signal is a torque-up signal of the power-driven torque driver.

8. The manufacturing method according to claim 5, further comprising locating a relative position of the part with respect to the product using the calculated three-dimensional position of the part and the calculated three-dimensional position and direction of the product, wherein the relative position is used in the searching.

9. A computer-readable non-transitory storage medium storing a program used to direct a computer to execute a process comprising:
receiving a signal which is caused by a tool used by an operator for attaching a part to a product and which indicates completion of attaching the part to the product;
capturing, from a plurality of cameras each configured to take an image of a range including the product and the tool, a plurality of images of the range upon receipt of the signal;
detecting a three-dimensional position and a three-dimensional direction of an operation table and a three-dimensional position and a three-dimensional direction of the tool via image recognition using the plurality of captured images, wherein the operation table includes a leg portion which enables the operation table to move on a floor as desired by the operator and a table plate which is rotatable as desired by the operator with respect to at least one axis, and the product is fixed to a determined position on the operation table to keep a predetermined positional relation between the operation table and the product;
calculating, by the processor, a three-dimensional position and a three-dimensional direction of the product from the three-dimensional position of the operation table, the three-dimensional direction of the operation table, and the predetermined positional relation;
calculating a three-dimensional position of the part from the three-dimensional position and the three-dimensional direction of the tool;
searching design data in which three-dimensional coordinates of each of a plurality of three-dimensional positions to which a plurality of parts are to be attached are included and represented according to a three-dimensional coordinate system based on the product, for a three-dimensional position that is one of the plurality of three-dimensional positions and that matches the calculated three-dimensional position of the part; and
identifying, by the processor, which of the plurality of three-dimensional positions the part has been attached to by the tool, according to a result of the searching the design data.

10. The storage medium according to claim 9, wherein:
the three dimensional position and direction of the tool are detected by detecting a plurality of markers on the tool via image recognition using the plurality of captured images; and
the three-dimensional position and direction of the operation table are detected by detecting a plurality of markers on the operation table via image recognition using the plurality of captured images.

11. The storage medium according to claim 9, wherein the tool is a power-driven torque driver, and
the signal is a torque-up signal of the power-driven torque driver.

12. The storage medium according to claim 9, wherein the process further comprises locating a relative position of the part with respect to the product using the calculated three-dimensional position of the part and the calculated three-dimensional position and direction of the product, wherein the relative position is used in the searching.

* * * * *